US011256666B2

(12) United States Patent
Minborg

(10) Patent No.: US 11,256,666 B2
(45) Date of Patent: Feb. 22, 2022

(54) METHOD AND APPARATUS FOR HANDLING DIGITAL OBJECTS IN A COMMUNICATION NETWORK

(75) Inventor: Per-Ake Minborg, Stora Hoga (SE)

(73) Assignee: Speedment, Inc., Palo Alto, CA (US)

( * ) Notice: Subject to any disclaimer, the term of this patent is extended or adjusted under 35 U.S.C. 154(b) by 1489 days.

(21) Appl. No.: 13/881,062

(22) PCT Filed: Nov. 2, 2011

(86) PCT No.: PCT/IB2011/002905
§ 371 (c)(1),
(2), (4) Date: Jun. 10, 2013

(87) PCT Pub. No.: WO2012/059816
PCT Pub. Date: May 10, 2012

(65) Prior Publication Data
US 2014/0149365 A1    May 29, 2014

Related U.S. Application Data

(60) Provisional application No. 61/410,201, filed on Nov. 4, 2010.

(51) Int. Cl.
*G06F 16/90*       (2019.01)
*G06F 16/174*      (2019.01)
(Continued)

(52) U.S. Cl.
CPC ...... *G06F 16/1748* (2019.01); *G06F 16/2343* (2019.01); *G06F 16/24552* (2019.01); *G06F 16/252* (2019.01); *G06F 16/27* (2019.01)

(58) Field of Classification Search
CPC ......... G06F 17/30156; G06F 17/30362; G06F 17/3048; G06F 17/3056; G06F 17/30575;
(Continued)

(56) References Cited

U.S. PATENT DOCUMENTS 5,884,324 A * 3/1999 Cheng ............... G06F 17/30575
6,591,266 B1 * 7/2003 Li ..................... G06F 17/30902
(Continued)

FOREIGN PATENT DOCUMENTS

GB          2366406         6/2002

OTHER PUBLICATIONS

International Preliminary Report on Patentability (dated Feb. 11, 2011).
(Continued)

*Primary Examiner* — Shew Fen Lin
(74) *Attorney, Agent, or Firm* — Goodwin Procter LLP

(57) ABSTRACT

Systems and methods for accelerating relational database applications are disclosed whereby the retrieval of objects can be 100,000 times faster than state of the art methods. According to embodiments of the present invention, an application may directly obtain digital objects from an in-memory store rather than querying a possibly remote data source. In some embodiments, several in-memory nodes are deployed simultaneously, for example, in clusters. Changes in underlying data store(s) can be updated to in-memory cache with SQL triggers. Potential queries may be predicted with automatically generated code. Advanced read/write locking mechanisms further improve the performance of data access.

12 Claims, 20 Drawing Sheets

(51) Int. Cl.
*G06F 16/23* (2019.01)
*G06F 16/25* (2019.01)
*G06F 16/2455* (2019.01)
*G06F 16/27* (2019.01)

(58) Field of Classification Search
CPC ............ G06F 16/1748; G06F 16/2343; G06F 16/24552; G06F 16/252; G06F 16/27
See application file for complete search history.

(56) References Cited

U.S. PATENT DOCUMENTS

| | | | |
|---|---|---|---|
| 6,697,849 B1* | 2/2004 | Carlson | G06F 9/54 709/203 |
| 7,099,927 B2 | 8/2006 | Cudd | |
| 7,143,123 B2* | 11/2006 | Tom | G06F 17/30575 |
| 7,296,028 B1* | 11/2007 | Ivanova | G06F 8/74 |
| 7,426,559 B2* | 9/2008 | Hamel | G06F 17/30578 700/10 |
| 7,526,481 B1* | 4/2009 | Cusson | G06F 17/30902 |
| 2002/0198993 A1 | 12/2002 | Cudd | |
| 2003/0018614 A1* | 1/2003 | Hayes | G06F 9/445 |
| 2003/0051063 A1* | 3/2003 | Skufca | G06F 16/972 719/310 |
| 2003/0208505 A1* | 11/2003 | Mullins | G06F 16/289 |
| 2004/0210909 A1* | 10/2004 | Dominguez, Jr. | H04L 29/06 719/316 |
| 2006/0004794 A1* | 1/2006 | Pizzo | G06F 16/2445 |
| 2006/0050150 A1 | 3/2006 | Yamane | |
| 2006/0095434 A1* | 5/2006 | McCullough | G06Q 10/087 |
| 2007/0055647 A1* | 3/2007 | Mullins | G06F 16/289 |
| 2007/0239797 A1* | 10/2007 | Cattell | G06F 16/217 |
| 2007/0250601 A1 | 10/2007 | Amlekar et al. | |
| 2009/0254589 A1* | 10/2009 | Nair | G06F 17/30581 |
| 2010/0262780 A1* | 10/2010 | Mahan | G06F 17/30902 711/118 |

OTHER PUBLICATIONS

Written Opinion (dated Feb. 11, 2011).
International Search Report (dated Feb. 11, 2011).
"Oracle TimesTen In-Memory Database Architectural Overview Release", Jan. 1, 2006 (122 pages).
Fitzpatrick, "Distributred Caching with Memcached", Linux Journal, vol. 2004, No. 124, Aug. 8, 2004 (8 pages).
Labrinidis et al., "Caching and Materilzation for Web Databases"., vol. 2, No. 4, Jan. 1, 2010 (101 pages).
European Search Report for European Applicaion No. 11837645.8, dated Mar. 29, 2017 (8 pages).
"Declarative Language", FOLDOC.org, http://foldoc.org/declarative%20languages, accessed on Sep. 16, 2019 (2 pages).
"SQL is a Declarative Language," https://365datascience.com/sql-declarative-language/, accessed on Sep. 13, 2019 (6 pages).
"The Declarative Nautre of SQL," Vegibit, https://vegibit.com/the-declarative-nature-of-sql/, accessed on Sep. 13, 2019 (5 pages).

* cited by examiner

Figure 10

```
CREATE DATABASE IF NOT EXISTS patent_example;
USE patent_example;

DROP TABLE IF EXISTS `language`;
CREATE TABLE `language` (
  `id` int(10) unsigned NOT NULL AUTO_INCREMENT,
  `name` varchar(45) NOT NULL,
  `flag_name` varchar(45) NOT NULL,
  PRIMARY KEY (`id`),
  UNIQUE KEY `Index_name` (`name`)
) ENGINE=InnoDB AUTO_INCREMENT=4 DEFAULT CHARSET=utf8;

INSERT INTO `language` (`id`,`name`,`flag_name`) VALUES
(1,'English','en'),
(2,'German','de'),
(3,'Spanish','es');

DROP TABLE IF EXISTS `user`;
CREATE TABLE `user` (
  `id` int(10) unsigned NOT NULL AUTO_INCREMENT,
  `name` varchar(45) NOT NULL,
  `email` varchar(45) NOT NULL,
  `selectedLanguage` int(10) unsigned NOT NULL,
  PRIMARY KEY (`id`),
  UNIQUE KEY `Index_email` (`email`),
  KEY `Index_name` (`name`),
  KEY `FK_user_selectedLanguage` (`selectedLanguage`),
  CONSTRAINT `FK_user_selectedLanguage` FOREIGN KEY (`selectedLanguage`) REFERENCES `language` (`id`)
) ENGINE=InnoDB AUTO_INCREMENT=6 DEFAULT CHARSET=utf8;

INSERT INTO `user` (`id`,`name`,`email`,`selectedLanguage`) VALUES
(1,'Adam Anderson','adam@company.com',1),
(2,'Ben Bacon','ben@ohancompany.com',1),
(3,'Charles Caulvert','charles@thecompany.com',2),
(4,'Daniel Duesemann','daniel@work.de',2),
(5,'Jose Fernandez','jose@libre.es',3);
```

```
public final class User extends UserBase { private static final long serialVersionUID = UserBase.SERIAL_VERSION_UID + 0;

/**
     * Plain constructor
     */
    public User() {
        super();
    }

/**
     * Copies a new (shallow) instance of this <code>User</code> object.
     */
    public User(User user) {
        super(user);
    }

```
public class UserMgrBase extends Manager<User> {
    private static final Logger logger = Logger.getLogger(UserMgrBase.class);
    final protected static Index<String> STRING_INDEX = new StringIndex();
    private final StaticKeyTypeMap<String, UserMapOnHeapImpl> nameMap;      // INDEX 'index_name' ('name' ASC)
    private volatile long numFindByNameInvocations;
    private final StructConcurrentHashMap<String, User> emailMap;           // UNIQUE KEY 'index_email' ('email' ASC)
    private volatile long numFindByEmailInvocations;
    private final StaticKeyTypeMap<Integer, UserMapOnHeapImpl> selectedLanguageMap;   // INDEX 'FK_user_select
    private volatile long numFindBySelectedLanguageInvocations;
    private final ArrayList<StaticKeyTypeMap<?, UserMapOnHeapImpl>> nonUniqueMapList;

//<editor-fold defaultstate="collapsed" desc="***** Constructors *****">
    /**
     * Constructs a new instance of this {@link parent_example.db0.patent_example.user.UserMgr UserMgr} object.
     */
    protected UserMgrBase() {
        super();
        _storageEngineType = StorageEngineType.ON_HEAP;
        _primaryKeyMap = new UserMapOnHeapImpl();
        _primaryKeyMap.writeProtect();
        nonUniqueMapList = new ArrayList<StaticKeyTypeMap<?, UserMapOnHeapImpl>>();
        addUnique(User.COLUMN_ID, _primaryKeyMap);
        nameMap = new StaticKeyTypeMapConcurrentHashMap<>();
        nameMap.setKeyClass(String.class);
        addNonUniqueMap(User.COLUMN_NAME, nameMap);
        emailMap = new StructConcurrentHashMap<>();
        emailMap.setKeyClass(String.class);
        emailMap.writeProtect();
        addUniqueMap(User.COLUMN_EMAIL, emailMap);
        selectedLanguageMap = new StaticKeyTypeMapConcurrentHashMap<>();
        selectedLanguageMap.setKeyClass(Integer.class);
        addNonUniqueMap(User.COLUMN_SELECTEDLANGUAGE, selectedLanguageMap);
    }
    //</editor-fold>
```

Figure 13B

```
@Override
public void add(final User user) {
    final String _key = user._getPrimaryKeyString();
    writeLock();
    try {
        super.add(_key, user);

UserMapOnHeapImpl nameSubMap = nameMap.get(user.getName());
        if (nameSubMap == null) {
            nameSubMap = new UserMapOnHeapImpl(1);
            nameSubMap.writeProtect();
            nameMap.put(user.getName(), nameSubMap);
        }
        nameSubMap.unsafePut(_key, user);

if (!emailMap.containsKey(user.getEmail())) {
            emailMap.unsafePut(user.getEmail(), user);
        }

UserMapOnHeapImpl selectedLanguageSubMap = selectedLanguageMap.get(user.getSelectedLanguage());
        if (selectedLanguageSubMap == null) {
            selectedLanguageSubMap = new UserMapOnHeapImpl(1);
            selectedLanguageSubMap.writeProtect();
            selectedLanguageMap.put(user.getSelectedLanguage(), selectedLanguageSubMap);
        }
        selectedLanguageSubMap.unsafePut(_key, user);
    } finally {
        writeUnlock();
    }
    if (_propertySupport.hasListeners(null)) {
        new Thread() {
            @Override
            public void run() {
                _propertySupport.firePropertyChange(getObjectClass().getName()+"."+_key, null, user);
            }
        }.start();
    } else {
    }
}
```

Figure 13C

METHOD AND APPARATUS FOR HANDLING DIGITAL OBJECTS IN A COMMUNICATION NETWORK

CROSS REFERENCE TO RELATED APPLICATIONS

This patent application is the U.S. National Phase of, and claims priority to, PCT Application No. PCT/IB2011/002905, filed Nov. 2, 2011, which claimed priority to U.S. Provisional Application No. 61/410,201, entitled "Method and Apparatus for Handling Digital Objects in a Communication Network," filed Nov. 4, 2010. Both of these earlier applications are hereby incorporated by reference in their entireties.

FIELD OF THE INVENTION

Embodiments of the present invention relate generally to methods and apparatus for handling digital objects in a communication network. More specifically, embodiments of the invention relates to a communication system, which connects to a private or public data communication network (such as the Internet) and allows applications to obtain and store digital objects (such as database rows) more efficiently.

BACKGROUND OF THE INVENTION

The present evolution of data-communication is such that more and more users gain access to the Internet worldwide. Internet has become not only a source of knowledge but also a market place for business, and it continues to attract more users. Currently, there is a high pressure on the data-communications industry to provide solutions that allow everyone to gain access to Internet. Broadband solutions are continuously developed, and both local as well as national access networks are planned and launched. Users are connecting to the Internet via various connection types such as fiber channels, cable TV lines, xDSL, Ethernet, GSM, UMTS, WiFi and satellite systems.

Numerous information providers are present on the Internet providing all kinds of services. Many organizations have mission critical data in their SQL databases. The size of those databases tend to vastly increase each year and at the same time the number of served transactions grow at an accelerating rate, according to an even steeper curve. Furthermore, the complexity of the database and its relations often deepens. By the increase of interactivity and the rising number of Internet users, there is an ever increasing demand for more database capacity and capabilities. However, currently, existing solutions have several drawbacks including their lack of performance.

Many larger organizations are challenged to maintaining existing or delivering higher levels of database performances. For example, organizations often have numerous legacy tools and applications which communicate with SQL databases. Adding to this are multiple third-party applications available for direct SQL usage. As a result, from a technical perspective, it is neither desirable nor feasible for organizations to deploy other databases than SQL. However, the SQL standard is relatively old and does not support an object oriented programming approach. The performance may at times be limited by the row oriented approach employed by SQL as well as the dynamic relation of information elements that often take place upon the request of information elements.

Capacity and performance are key factors when it comes to organizations' bottom-line. Slow web sites or poorly executed queries often result in less traffic, dissatisfied customers or a negative user experience, therefore ultimately hurting the bottom-line. The problem is universal regardless of the type of industry such as retail, finance, insurance, government, gaming, health-care. Organizations in these industries will sooner or later face the problem as competition leaps ahead.

IT departments face the problems in multiple ways: external web sites, internal databases or complex relationship queries. For example, to keep database demand under control, IT departments are forced to increase database capacity by deploying more powerful servers. Sometimes the cost for database licenses increase linearly with the number of CPUs used.

Application developers are facing a number of problems when they handle digital objects in data sources. For example, application providers need to write code manually that reflects objects stored in data sources. They often need to write communication adapters to convert from the underlying data sources to modern program languages objects and programming paradigms.

Applicants have identified that there are several problems in the present way of handling objects in a communication network, searching for specific digital objects and subsequently obtaining them because of several reasons described above and hereunder. Several novel solutions have been devised to overcome these problems.

In view of the foregoing, it may be understood that there are significant problems and shortcomings associated with existing approaches for obtaining and storing digital objects.

SUMMARY OF THE INVENTION

Systems and methods for accelerating relational database applications are disclosed whereby the retrieval of objects can be 100,000 times faster than state of the art methods.

According to embodiments of the present invention, an application may directly obtain digital objects from an in-memory store rather than querying a possibly remote data source. In some embodiments, several in-memory nodes are deployed simultaneously. This allows capacity to be scaled almost linearly while at the same time it provides for redundancy should one or several in-memory stores become unavailable.

Embodiments of the present invention accelerate organizations' databases while still retaining the actual data in the existing databases (e.g., SQL databases). Furthermore, embodiments of the invention utilize modern programming language paradigms and can automatically generate error-free code by using the underlying databases' definitions. One embodiment provides elastic cloud scalability and redundancy in order to support a successful implementation of mission critical applications. As a result, organizations can run enormous amounts of mission critical data while maintaining their existing infrastructure, minimize the cost for IT investments on hardware and licenses, and ultimately better support the overall business goals of the organizations.

In one particular exemplary embodiment, the present invention has been deployed for an Electricity Power Grid where there are over 18,000 measuring points (measuring voltage, current, power, phase angles, frequencies etc.) each reporting its measured value each hour and there are over four years of data available. Thus, there were over 500 million measurements in an RDBMS. When analyzers wanted to request data from a handful measure points within a specific time interval (typically a month) the waiting time was in the minutes using state-of the art methods (i.e. querying the RDBMS) whereas it was sub millisecond using variants of the present invention. The required in-memory storage was, due to an efficient storage scheme, 18 times less than the table space occupied by the RDBMS.

One technical effect of the systems and methods of the present invention is that they facilitate more efficient database access and improves the performance and user experience of Internet or web applications. Another technical effect of the systems and methods of the present invention lies in improved database management including automated generation of database code.

Embodiments of the present invention have been successfully deployed on a variety of platforms ranging from large server clusters down to small embedded servers with very limited memory and CPU performance. In small server deployments with very limited resources available, the present invention can make the difference between success and failure.

The present invention is in no way limited to the Internet or its current state. All the methods and apparatus may be applied in other data communication networks providing communication means between two or more distinct location as well as internal communication within a single node.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 10 illustrates an exemplary relational database structure.

FIGS. 13A-13C illustrate a part of a communication system with an improved solution in accordance with one or several embodiments of the present invention relevant to the example in FIG. 10, FIG. 11 and FIG. 12 depicting an exemplary code snippet.

DETAILED DESCRIPTION OF THE INVENTION

Embodiments of the present invention can accelerate database access and thereby improve the performance of various software or web applications. Some features and advantages of the present invention may include: (1) improvement of database speed performance up to 100,000 times or more by utilizing same-side architecture, a Speculative Query Cache (SQC), and/or a Real Time data source Reflector (RTR); (2) scaling linearly with the capacity of a server node; (3) arrangement of the nodes into clusters and super clusters to allow organizations to grow and scale up their capacity linearly with unlimited system query capacity; (4) analyzing the underlying data sources and automatically creating code which directly reflects the structure of the underlying data sources, wherein the error-free code is quickly generated and can greatly reduce development time and improve the application quality; (5) allowing developers to write their own code generation rules and extensions, using application programming interfaces (APIs), to further tailor their needs; and (6) applicability to capacity and performance problems on new as well as existing databases in organizations.

In order to simplify the description below, the disclosure herein refers to data stores in general and uses Structured Query Language (SQL) databases and access by web servers as examples. A data store is typically an application that enables storage and retrieval of digital objects including but not limited to SQL databases, XML files, and/or Spread Sheets and files. An SQL database can be any database partially or fully complying with any of the Structured Query Language (SQL) standard. Examples of SQL-databases include IBM DB2, Microsoft SQL Server, Oracle, PostgreSQL and MySQL. It should be noted that embodiments of the invention are not restricted to just SQL databases or web server applications. Instead, embodiments of the present invention may connect to or be implemented for a plurality of different data sources and applications accessing such data sources.

Below, the terms "set" and "subset" are used. A set is a collection of objects. A set can be empty. A set A is said to be empty if it does not contain any objects. In the following, a set B is a subset of a set C if B is "contained" inside C. B and C may coincide.

Figure 1:
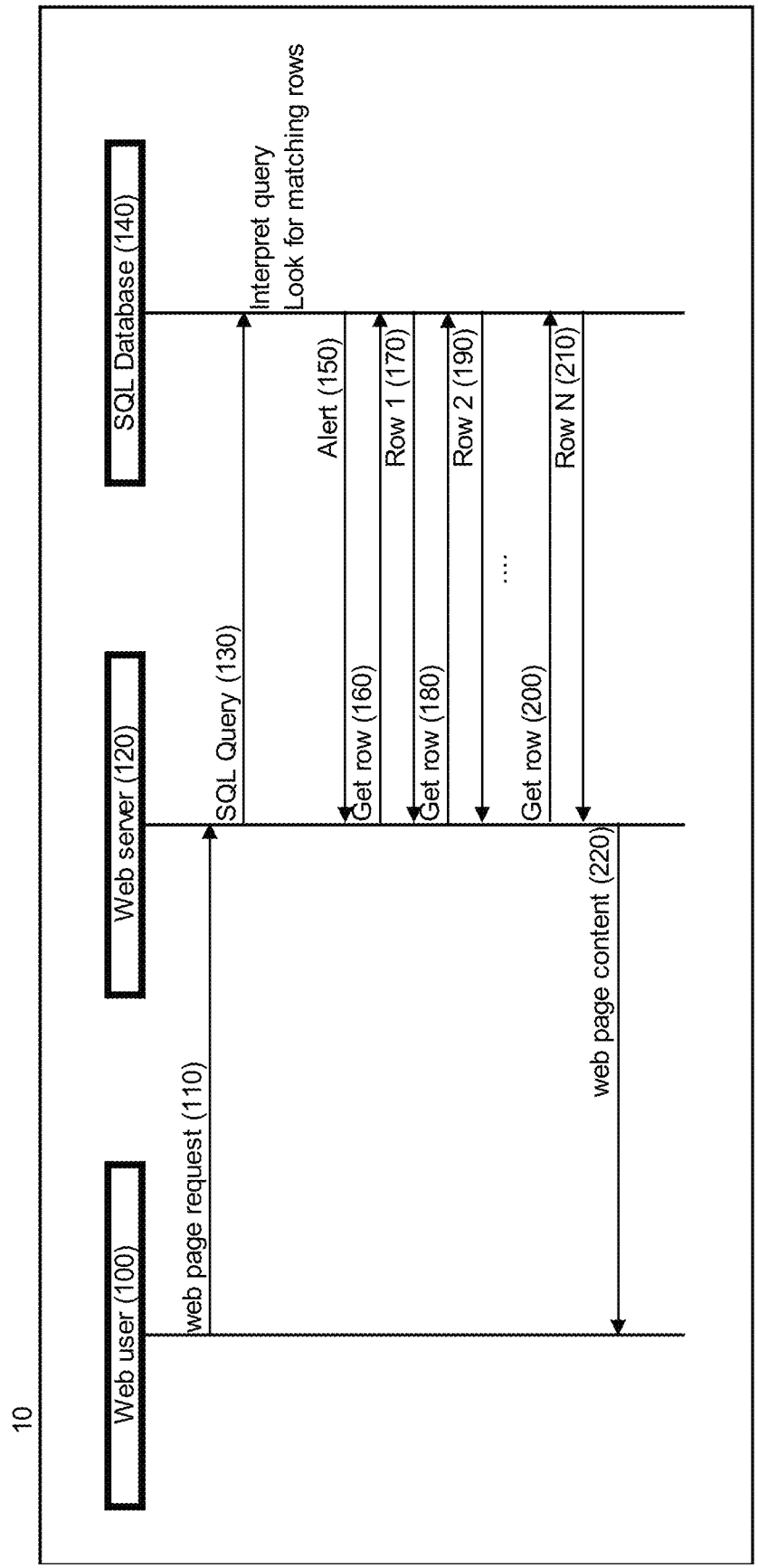
FIG. 1 illustrates a communication system where a number of different communication networks and nodes are interconnected according to the current state of the art.

Referring to FIG. 1, there is shown a communication system where a number of different communication networks and nodes are interconnected according to the current state of the art.

FIG. 1 shows a communication system (10) where a web user (100) requests a web page, resulting in a web page request (110) being sent from the user's web browser, via a communication system such as the Internet, to a designated web server (120). The web server typically analyzes the request (including the uniform resource identifier (URI), zero or more uniform resource locator (URL) parameters and any number of cookies) and compiles an SQL query (130) relevant to the information objects that are to be presented in response to the web page request (110). For example, if the user (100) has selected two different car models of interest, the SQL query may indicate selection of one or several rows that describe those car models including, for example, the engine alternatives, coloring schemes and fuel consumption. The SQL query (130) is then subsequently sent to an SQL database (140). The SQL database (140) then interprets the query, determines which tables shall be used for searching and selects an appropriate search algorithms (based on its internal structure such as indices and current rows in memory) and, when the search procedure is started or completed, sends an alert message (150) indicating that an answer has been found. The web server, in response to the alert message (150), then sequentially obtains an appropriate number of rows (determined either by the number of available rows or by the web server's desires to obtain a particular number of rows). Each row is obtained by the web server by sending a "get row" message (160, 180 and 200) that triggers the SQL server to send the actual row content (170, 190 and 210). In many cases the number of rows can be substantial. In one example, the number of rows exceeds 10,000; in another case, the number of rows exceeds 10,000,000.

After all rows have been obtained by the web server (or while the rows are being obtained by the web server), the web server compiles a web-page which is sent to the web user (100). Because the protocol between the web server and the SQL server is so talkative, the total communication round-trip delay may be significant. In one example, the total round-trip delay exceeds one second; in another case, the total round-trip delay exceeds several hours. If many web servers are communicating with the same SQL server at the same time, the SQL server must set aside a significant amount of resources to hold buffers and communication states. Locking and consistency requirements will further burden the SQL server if it gets flooded by queries. Another problem is that, due to its centralized design, the SQL server does not scale well when its capacity is increased.

It should be noted that the SQL database may be another type of data source using other communication primitives than SQL.

Figure 2:
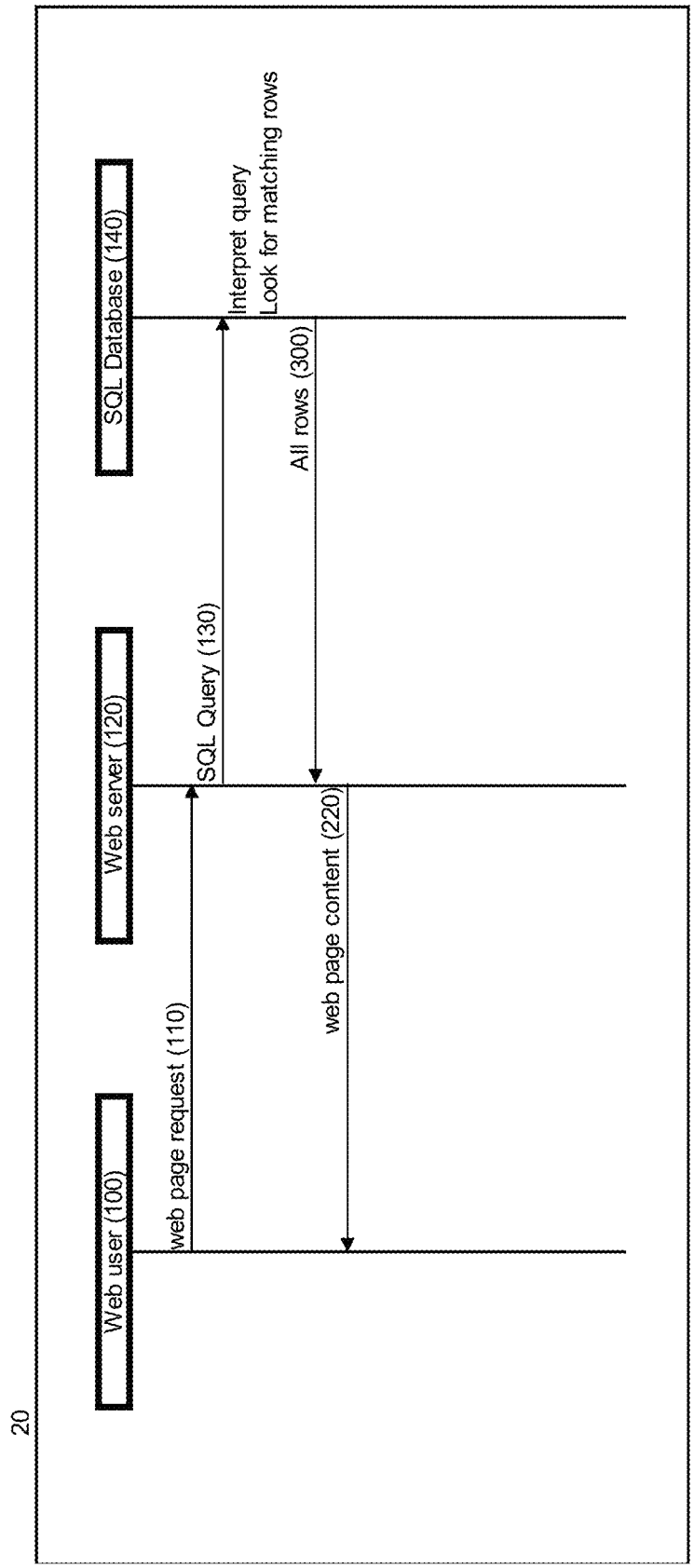
FIG. 2 illustrates a communication system where a number of different communication networks and nodes are interconnected according to the current state of the art.

FIG. 2 illustrates a communication system where a number of different communication networks and nodes are interconnected according to the current state of the art.

FIG. 2 shows a communication system (20) that initially works the same way as communication system (10) in FIG. 1. However, when the SQL database (140) has determined one or several matching rows, it bundles a number of rows into a single message (e.g., all matching rows). This method reduces the latency between the web server and the SQL database, thus improving overall performance and reducing internal resource handling. However, if the web server (120) was only interested in a subset of the rows that were available, this scheme may in some cases generate communication overhead. In one example, a communication system (20) may reduce the latency by 50% compared to a communication system (10).

Figure 3:
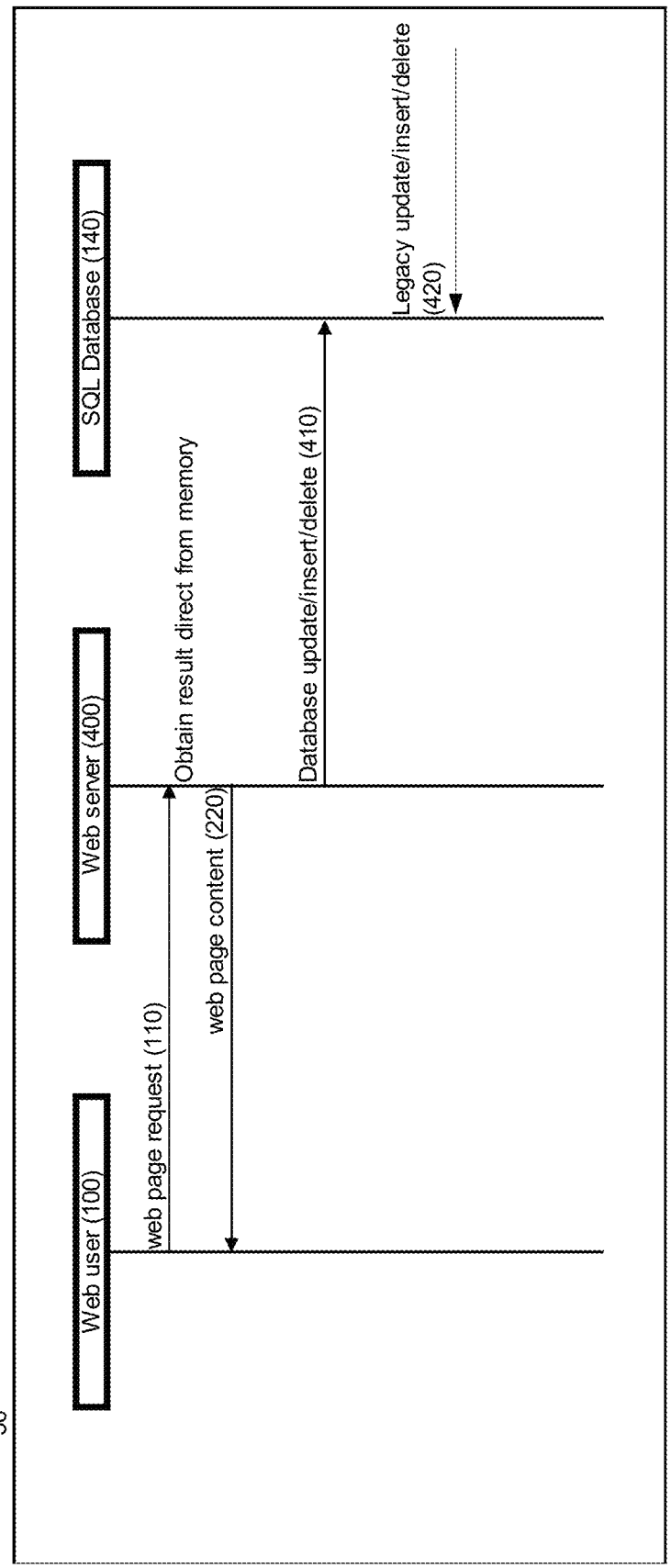
FIG. 3 illustrates a communication system where a number of different communication networks and nodes are interconnected according to the current state of the art.

FIG. 3 illustrates a communication system where a number of different communication networks and nodes are interconnected according to the current state of the art.

FIG. 3 shows a communication system (30) that initially works the same way as communication system (10) in FIG. 1. However a web server (400) now contains an in-memory cache with rows from the SQL database (140) that was previously obtained. Upon receiving a web page request (110) from the web user (100) the web server (400) determines that it has sufficient information in its in-memory cache and obtains the result directly form its memory. This is significantly faster than obtaining rows from the SQL database. It also allows scaling of the system's capacity by increasing the number of web servers since they typically have a significant cache hit ratio.

If the web server (400) does not have all the requested database rows in its in-memory cache, it can obtain them from the SQL database. This will slow down the system.

Database updates/inserts and deletes are first updating the in-memory store and are then sent to other web servers and to the SQL database. In other solutions the database updates/inserts and deletes are sent to the SQL database and the corresponding cache entries are invalidated in the web servers. This scheme in some cases prevents a mix of old (using plain SQL with no in-memory acceleration) and new accelerated application to co-exist because updates made by legacy applications are not reflected in the in-memory caches in web servers. For example, if a database updates/inserts and delete (420) is sent from an old applications, the web server (400) is unaware that it ever occurred and may be relying on one or more cached rows that are no longer up to date.

The in-memory cached database can also reside in other nodes used for only this caching purpose. In this case, web servers communicate with the cache servers via a communication network.

Communication systems like 30 may or may not contain the complete database content.

In-Memory Cache

According to embodiments of the present invention, schemas, tables, rows and indices of one or more databases may be stored in an in-memory cache, which allows for applications to access data much quicker than otherwise. Contributing factors to the increased speed include a) that memory access is several magnitudes faster than disc access and b) that memory communication is so much faster than network communication. Although there are other solutions available for in-memory cache, competing solutions have proven speedup factors only in the region of 2-16 times given a certain hardware and database configuration. As a comparison, embodiments of the present invention can provide speedup factors exceeding 100,000 times on the same hardware. In addition, implementation in accordance with the present invention can be further scaled linearly with unlimited potential.

Figure 4:
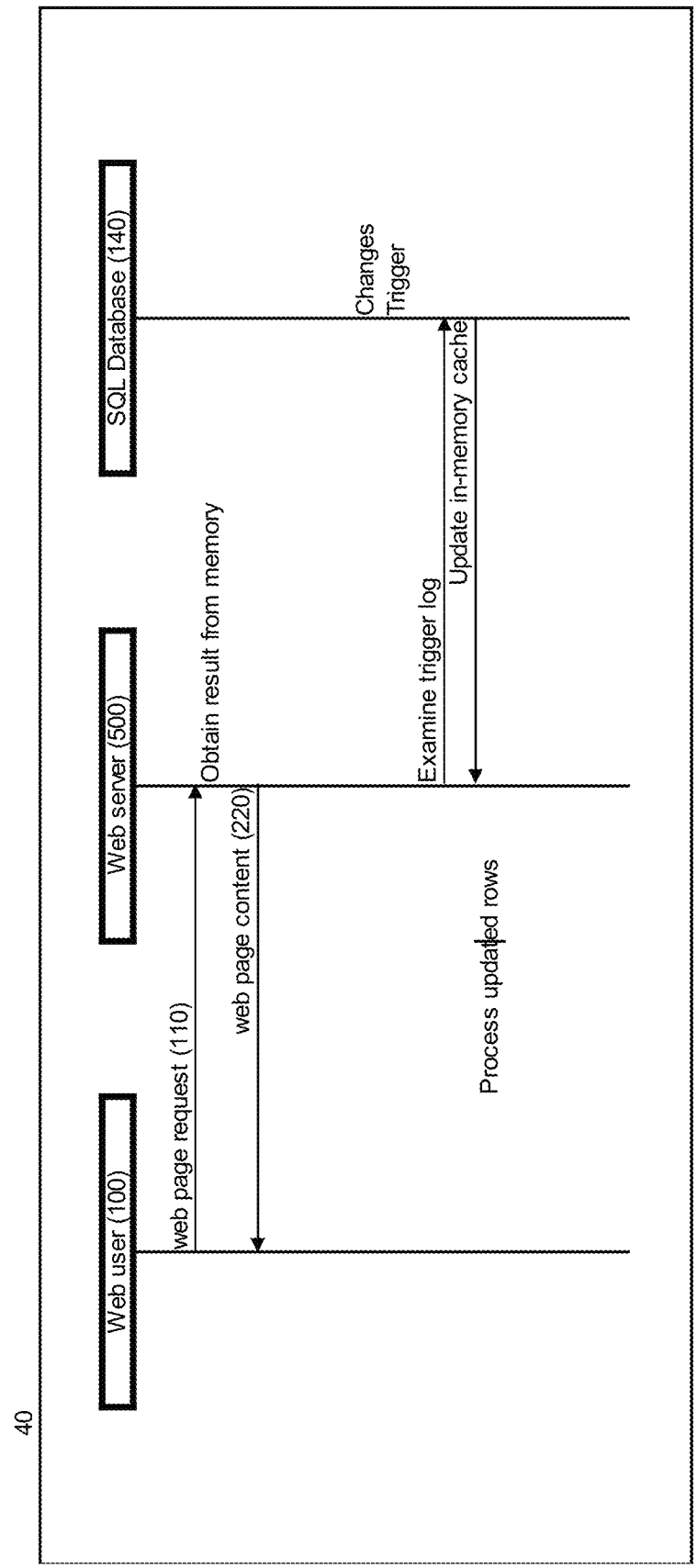
FIG. 4 illustrates a communication system with an improved solution where a number of different communication networks and nodes are interconnected in accordance with one or several embodiments of the present invention.

The following systems described in FIG. 4 and forwards, may include instructions executed on a computer. These systems may be or include a computer system. They may be described in the general context of computer-executable instructions, such as program modules, being executed by a computer. Generally, program modules include routines, programs, objects, components, data structures, etc. that perform particular tasks.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the OSX operating system the Apache™ operating system, an OpenStep™ operating system or another operating system or platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The following content presentation systems may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, C #, COBOL, dBase, Forth, FORTRAN, Java, Modula-2, Pascal, Prolog, RUM and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, SSD, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, touch screen, toggle switch, pushbutton, motion detectors or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including but not limited to a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extra-net, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. For some aspects of the invention, such as for the transfer of payments, the communications infrastructure may include networked systems such as the Electronic Funds Transfer (EFT) network, trade exchanges, and other communication channels known in the industry for implementing trading transactions (which may include settlement operations) such that those described herein.

Although many other internal components of the computer are not shown, those of ordinary skill in the art will appreciate that such components and the interconnections are well known. Accordingly, additional details concerning the internal construction of the computer need not be disclosed in connection with the present invention.

FIG. 4 illustrates a communication system with an improved solution where a number of different communication networks and nodes are interconnected in accordance with one embodiment of the present invention.

FIG. 4 shows an improved communication system (40) where a web user (100) requests a web page, resulting in a web page request (110) being sent from the user's web browser, via a communication system such as the Internet, to a designated web server (500). The web server typically analyzes the request (including the URI, zero or more URL parameters, and any number of cookies) and executes a query against its in-memory cache. The web server directly obtains rows from the in-memory cache. In one embodiment of the present invention, the rows are represented as programming language objects that are much easier to use in modern programming languages (for example a Java Object or a C++ Object). In one example the number of rows or objects exceeds 10,000; in another case, the number of rows or objects exceeds 10,000,000; and in yet another case the number of rows exceeds 10,000,000,000.

After all rows or objects have been obtained by the web server from its in-memory cache (or while the rows or objects are being obtained), the web server compiles a web-page which is sent to the web user (100). Because memory access is so much quicker than disk and network communication, the round-trip delay can be kept to a minimum. In one example, the round-trip delay is less than one millisecond; in another case, the round-trip delay is less than one nanosecond. Because web servers may execute queries without affecting the SQL database (140), resources in the SQL server can be preserved. Locking and consistency requirements will be further alleviated at the SQL server since it is no longer flooded by queries. Thanks to the decentralized topology, the systems capacity will scale with the number of web servers deployed.

It should be noted that the SQL database may be another type of data source using other communication primitives than SQL.

In an embodiment of the invention, the in-memory cache contains all relevant rows of the SQL database (140). In this way, the web server may be sure that all rows will be in local store. In other embodiments of the present inventions, only time critical tables are stored in-memory and other tables still remain in the SQL database (140) un-cached. In yet another variant of the present invention, only a subset of all the rows for a selected table are kept in local store.

Sometimes a node's internal memory (RAM) is insufficient to hold all rows in an SQL database. The web server may then employ a set of methods to remedy the situation including, for example:

1) Compressing rows and/or objects in memory
2) Determining multiple occurrences of any object and storing them once and instead storing references to the object. In an embodiment of the present invention, reference counters are used to be able to determine when objects can be purged from the system (i.e., when they are not referenced any more).
3) Storing objects on secondary storage. In an embodiment of the present invention, objects are stored on one or several fast disks (e.g. solid-state drive (SSD) disks) with high throughput and low access time.
4) When look-up maps are used, they too may be located on secondary storage.

In an embodiment of the present invention, the in-memory cache functionality is allocated to a dedicated node or a number of dedicated nodes. Application servers (such as web servers) may then query these in-memory cache servers via a communication network.

According to some embodiments, each node may contain a Speculative Query Cache (SQC) which updates in real time as the underlying data sources (e.g., databases) are changed. The SQC determines its prediction scheme from various sources including the original SQL databases' structures. To take a very simple example, if a table is sorted (i.e., has an index) on a field, it is likely that applications will try to locate data using this table as an index.

According to some embodiments of the present invention, it may be advantageous to implement a "same-side architecture" where the cached database content is co-located with applications that frequently access such content. When the SQC is located on the same computer as the applications that need to access the data source, predicted queries are executed extremely fast. In many cases, it may not even be necessary to iterate over any database rows, instead the answer may be already predicted, resulting in a round trip delay reduction factor exceeding one million. If the SQC is unable to predict the query, the speedup factor can still be in the region of several thousand times.

In variants of the present invention, code segments may be automatically generated so that predicted queries are exposed using convenient methods. For example, if a table "user" has an index on a column "name", then a method UserMgr.findByName(name) might be generated, exposing the existence of predicted queries.

In variants of the present invention, it is possible to add one or several "Materialized SQL Queries" (Hereafter MSQ) to the SQC such that the SQC will continuously maintain instantly available result sets for each of the added MSQs. This will greatly increase query speed at run time when any of the MSQs are sent to the system. As a drawback, it will require more CPU and storage resources for the SQC upon initial loading and whenever the underlying data source is changed. When an MSQ is added, it is initially executed internally and its corresponding result set (or a representation of a result set) is stored internally. Upon any change in the underlying data source, the system determines if the change would have any impact on the internal result set, if so, the internal result set is updated to reflect the underlying change.

The use of a web server is only exemplary and it should be noted that any application making use of data can take advantage of the present invention. For example, an application or an application server may use the in-memory cache server. The use of an SQL server is also exemplary. The present invention can be used on any data source.

In an embodiment of the present invention, the in-memory caching functionality is written in one programming language (e.g., Java), but by using shared memory regions, sockets or named pipes, applications can be written in other languages (e.g., C++ or .NET/C #). In an embodiment of the present invention, the in-memory caching functionality is run in a Java Virtual Machine (JVM), but one or several applications using the in-memory cache are run in other JVM's.

In some programming languages (including Java), space for objects are allocated as objects are created and are removed asynchronously and periodically in a process known as Garbage Collect (GC). When the number of objects are growing (which is likely when large in-memory caches are constructed), it becomes increasingly time consuming to purge unused objects. The process of determining unused objects often implies walking complex graphs and resolving complex dependencies. In some cases, the execution environment (e.g., a Java JVM) needs to lock all running threads and alter the object allocation graph resulting in a complete lock-out of service. These lock-out periods sometimes exceeds one second. In other cases, the lock-out periods may exceed several minutes. According to an embodiment of the present invention, cached in-memory objects may be converted (e.g., serialized) and stored in a container (such as an array). This greatly reduces the number of object that the execution environment needs to track. In yet another variant of the present invention, objects are stored off heap (for example, using Javas ByteBuffer.allocateDirect( ) function). These embodiments of the present invention will greatly simplify and speed up the GC procedure.

Flowcharts

Figure 5B:
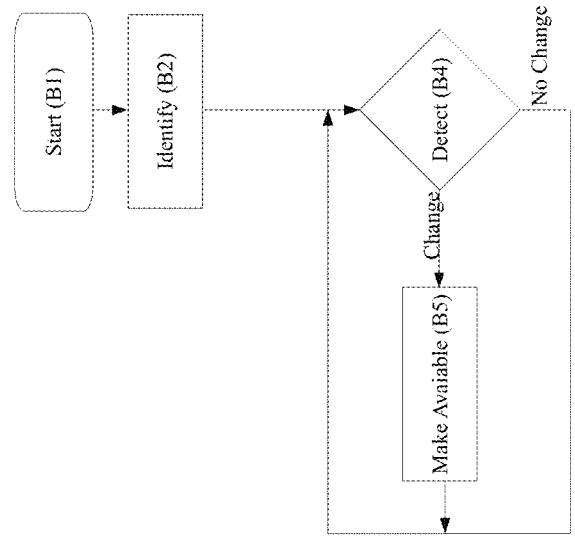
FIG. 5 illustrates a communication system with an improved solution where a number of different communication networks and nodes are interconnected in accordance with one or several embodiments of the present invention depicting two flowcharts.
Figure 5A:
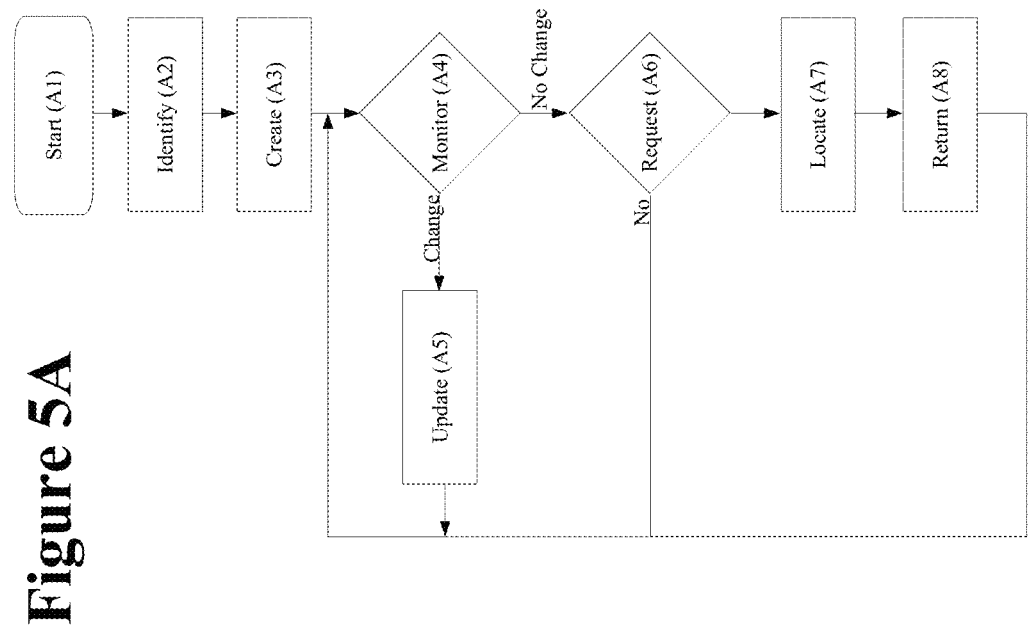

FIG. 5 illustrates a communication system with an improved solution where a number of different communication networks and nodes are interconnected in accordance with one or several embodiments of the present invention. The figure shows two flowcharts, where FIG. 5A illustrates an Application A that is separate from the data source (i.e., Application A runs on a different computer than the data source) and FIG. 5B illustrates an Application B in the data source (i.e., Application B runs on the same computer as the data source).

Referring to FIG. 5A, Application A first starts at step A1.

At step A2, a set of digital objects that are or may become existent in the data source and that shall be subject to accelerated access are determined. For example, a number of tables and a number of corresponding columns may be selected in a relational database. Also, a number of indices and constrains (such as foreign keys) may also be selected. The section can be made in many ways including, but not limited to, configuration files, software tools, generated code, code and database data.

At step A3, Application A creates a duplicate representation of the identified set of digital objects that are stored in the data source. For example, Application A may load the complete tables (rows) that where identified in step A2 and may construct additional data structures that allows digital objects to be retrieved rapidly (e.g., using associative maps). For example, if an index has been defined, a data structure that allows fast retrieval of data object using the indexes key may be constructed.

At step A4, Application A monitors the data source for changes relevant to the identified set of digital objects. This means that Application A may monitor the data source for any insertion, updating or deletion of the set of digital object. For example, if a new row is inserted in one of the tables that was determined in step A2, Application A will discover the addition of the row. If, for example, a row is updated (i.e. at least one column value is changed in an existing row), Application A will be able to identify the updated row. If, for example, an existing row is deleted, Application A will be able to identify the deleted row. If Application A's monitoring determines that there has been at least one change, the procedure continues at step A5, else (i.e. no change) the procedure continues at step A6.

At step A5, where the monitoring resulted in a determination of a change, Application A updates the duplicate representation using update, delete and/or add methods. For example, if a new row has been added, a new object representation of that row is created and is subsequently added to Application A's data structures (e.g., associative maps). If, for example, an existing row is changed, a new representation of that row is created and will replace the old row object in Application A's data structures. In variants of the present invention, the old existing row object is updated. If, for example, an existing row is deleted, application A removes the old row object from its internal data structures.

At step A6, application A checks if it has been receiving, from a user application, a request for one or more digital objects whereby a set of request parameters are specified. For example, a request for a user may be received where the user's e-mail may be passed as a parameter. If no request was received the procedure continues at step A4, else (if there was a request) the procedure continues at step A7. Of course, this step (and the following steps) may be explicitly invoked by a user-application at any time asynchronously. The user-application may, in variants of the present invention, gain direct access to Application A's data structures and objects.

In step A7, Application A locates a subset of the duplicate representation of the identified set of digital objects in view of the set of request parameters. For example, if a request was made for a user using the user's e-mail as a parameter, Application A (or the user-application itself) may consult Application A's internal data structures in order to rapidly retrieve the correct user. For example, using an associative map with the e-mail as the key.

In step A8, Application A (or the user-application itself) returns the set of digital objects that were located in view of the parameters.

Referring now to FIG. 5B, Application B first starts at step B1.

At step B2, a set of digital objects that are or may become existent in the data source and that shall be subject to accelerated access are determined analogue to step A2.

At step B4, Application B detects potential changes to the identified set of digital objects and if there are any changes, the procedure continues to B5, otherwise the procedure continues at step B4.

At step B5, application B, makes the changes readily available for monitoring and/or notifies Application A of the changes. For example, Application B may send a message to Application A. The message may just inform Application A that there has been a change. The message may also contain information elements that Application A can use to figure out what has been changed in the data source (for example, the table name and the id of a row that has been updated). Application B may also store the changes in a separate table that acts as a history log of the changes. Application A may then use the history log to see what actions it must perform to bring the duplicate representations up to date.

In variants of the present invention, the applications A and B will be aware of the time when a change was made. It shall be noted that the flowcharts or parts of the flowcharts can be executed concurrently in different threads and/or processes.

It should be noted that the present invention, as described herein, may take a number of appearances and that the flowcharts only shows some examples.

Cluster of Cache Nodes

Figure 6:
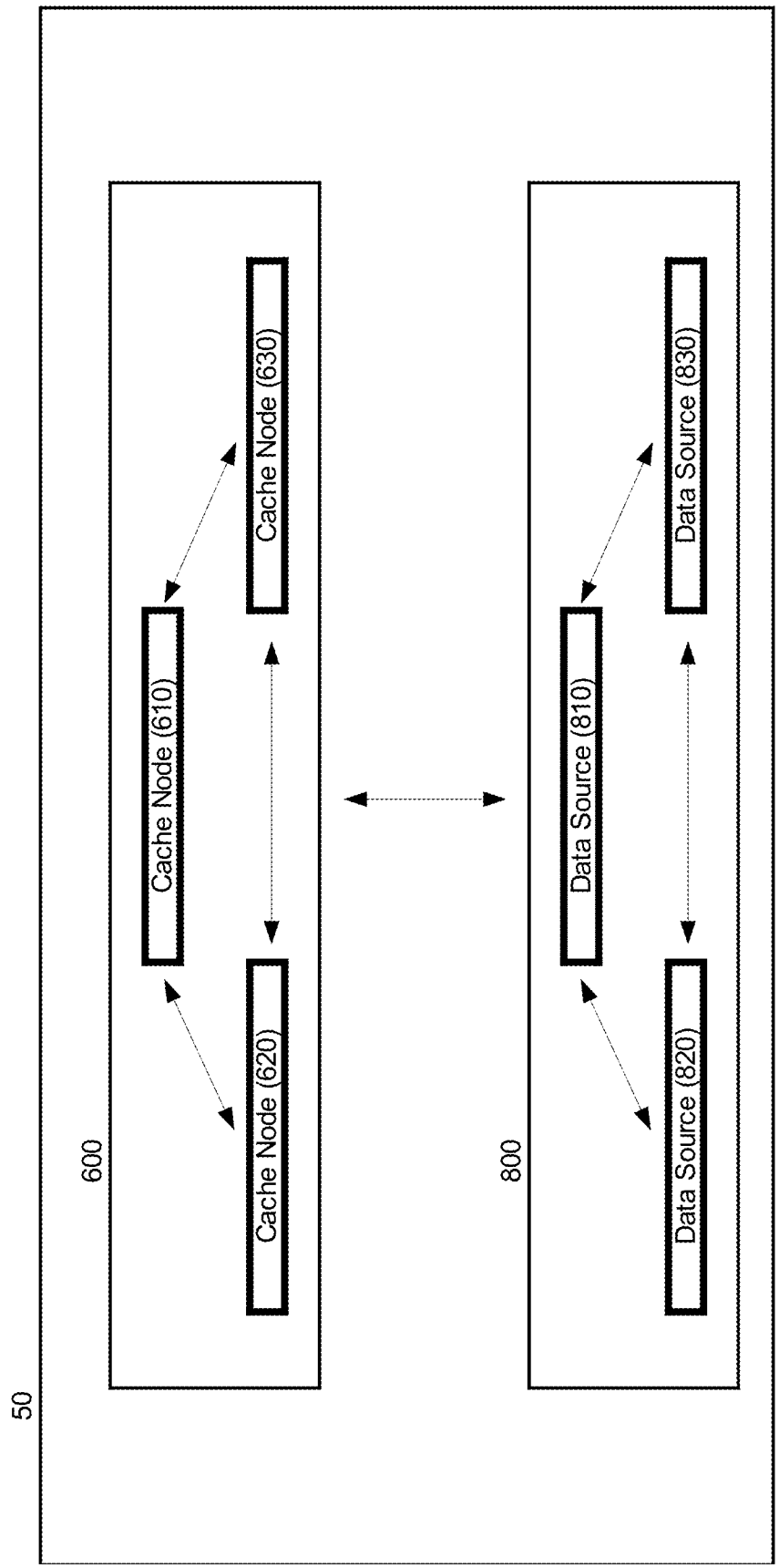
FIG. 6 illustrates a communication system with an improved solution where a number of different communication networks and nodes are interconnected in accordance with one or several embodiments of the present invention using a cluster.

FIG. 6 illustrates a communication system with an improved solution where a number of different communication networks and nodes are interconnected in accordance with one or several embodiments of the present invention using a cluster.

FIG. 6 shows an improved communication system (50), according to some embodiments of the present invention, where the cache node (610), cache node (620) and cache node (630) are arranged into a cluster (600). The cluster (600) is connected to a set of backing data sources 810, 820 and 830. The complete set of backing data sources (800) comprises the backing data sources 810, 820 and 830. It should be noted that any number of cache nodes and data nodes can be used.

According to some embodiments of the present invention, the cache nodes may be configured to automatically arrange themselves into clusters. A joining node may connect itself to a cluster and initialize without interacting with the backing data source(s), whereby data objects are obtained form one or several existing members of the cluster. According to one embodiment, a member node may be allowed to join or leave a cluster at any time with no locking imposed on other members of the cluster. Members may discover each other by using a certain configurable Rendezvous Port (TCP). One cache node may be elected as a cluster controller. It controls the other members' entry into the cluster and maintains consistent cluster configuration with all the other members.

Updates in the backing data sources may be automatically propagated within the cluster, preventing additional load on the backing data sources as new nodes are added to the cluster. This will free up the backing data source compared to the case when each and every cluster member needs to update its state individually. For example, if cache node 610 is connected to a set of the underlying data source(s) 800, then cache node 620 may obtain information pertaining to updates of the underlying data source(s) via cache node 610.

Furthermore, several clusters may be arranged to form a super-cluster. This allows organizations to grow and scale up their capacity linearly with unlimited system query capacity. In variants of the present invention, in a super-cluster, each underlying cluster updates its content from the data source. In other variants of the present invention, clusters in a super-cluster, updates its content from other clusters.

The cache nodes in a cluster or one or more individual nodes may have a built-in web server for supervision, statistics and management purposes. The web server may support XML-based access for ease of integration with other applications.

Associative Maps

In variants of the invention, objects and/or rows are stored in an associative map. Such a map provides the ability to locate an object directly from a search key. There are different types of standardized maps with different characteristics. For example, a Java HashMap can map from a key to an associated object in constant time (i.e., present an object in a time that does not depend on the size of the map). This means that its latency behavior is $O(1)$ (as opposed to linear searching a list for an occurrence where the latency behavior is $O(n)$, where n is the length of the list). Such predictable, consistent query time may be beneficial as SLAs and other time requirements can be met without over-provisioning. There are other maps such as the Java ConcurrentHashMap that allows several threads to access the map simultaneously. Both read and write threads may be active at the same time. There are also other maps (such as the ConcurrentSkipListMap) that allow threads to iterate over and/or search keys in an order. The order can be user defined. For example, it is possible to iterate over a map with user names as keys in the key's natural order (e.g., alphabetic). It shall be noted that the present invention is not restricted to the map types given above. Instead, other map types can be used, too.

Many queries are executed in $O(1)$ time, meaning that latency and capacity is not affected by the size of the database tables at all. In addition, a number of common queries resulting in an object list (i.e. finding objects with a Foreign Key to an object) are also executed in $O(1)$ time. This is something that, by definition, only can be obtained in same-side architecture. In this example, it means that regardless of how large the tables are and regardless of how many Foreign Keys point to an object, a list of the matching objects will be obtained equally fast.

In the following, several aspect of the present invention will be explained. To simplify matters, an exemplary database table will be used. It should be noted that the present invention in no event is limited to the example; on the contrary, the present invention can be adapted to a plurality of different databases and database structures.

Let us assume that we have an exemplary database, containing a database table named 'user' where a large number of rows exists. The table contains the following columns 'id,' 'name,' 'family name,' 'born,' 'email,' 'country' and 'created.' The column 'id' is the table's primary key, meaning that it is unique for all rows. The 'id' field is of type 'longint(20)' meaning that it may have up to 20 digits and 'autoinc' meaning that its value will be automatically set for new rows using increasing numbers 1, 2, . . . N. The fields 'name' and 'family name' have values with a maximum length of 64 characters. The 'born' field is of type 'int(10),' the 'email' are characters with a maximum length of 64 characters, and the column 'country' is of type 'int(10)' and is also a foreign key to another table named 'country_list' and its corresponding 'id' field. The 'created' field contains a timestamp when a user was first created in the system. There are several indices in the table: the columns 'name,' 'family name,' 'born,' 'country' and 'created' all have non unique indices; the column 'email' has a unique index. For example, there is one row with {id=1001, name="Bob," familyName="Smith," born=1965, email="bob_smith@clever.com," country=1, created="2010-05-10 11:23:12.3"}, another with {id=1002, name="Maria," familyName="Smith," born=1980, email="ytbas@fast.com," country=1, created="2010-03-12 05:42:22.1"}, and another with {id=1234, name="Heinz," familyName="Mueller," born=1970, email="hmueller@gross.de," country=49, created="2010-06-12 23:13:19.2"}.

The table 'country_list' contains an 'id' field which also is the table's primary key and also contains a 'name' column that describes the name of the country. For example, there is one row with {id=1 and name="USA"} and another row with {id=49 and name="Germany"}. The table also has a unique index for the name (two countries cannot have the same name).

Below, the notation k: $\{m_0=?, m_1=?, \ldots, m_n=?\}$ denotes a map entry with the key k and an object containing the members enclosed in the curl brackets. Objects that have the same content, may be stored using a reference in the map so storage space can be conserved. In fact, all objects can be stored with a reference to the object and not the object itself.

In the following embodiments of the present invention, the invention will be referred to as an EAS (Elastic Application Platform).

When the first instance of an EAS is started, it connects to one or more backing data sources (e.g., databases) and retrieves zero or more rows containing zero or more columns in zero or more tables in one or more schemas.

In an embodiment of the present invention the EAS retrieves all rows containing a, per table, configurable set of columns in a configurable set of tables. For example, it may retrieve all rows containing all columns in the exemplary database. For each table, the EAS creates a map for the primary key called the PrimaryKeyMap. In the example, there may be two maps. A first map may be UserPrimaryKeyMap with the user id as key and the corresponding user object (containing a representation of the 'id,' 'name,' 'family name,' 'born,' 'email,' 'country' and 'created' columns). This map may have as many entries as there are number of users and will contain the following:

1001: {id=1001, name="Bob," familyName="Smith," born=1965, email="bob_smith@clever.com," country=1, created="2010-05-10 11:23:12.3"}, 1002: {id=1002, name="Maria," familyName="Smith," born=1980, email="ytbas@fast.com," country=1, created="2010-03-12 05:42:22.1"} and 1234: {id=1234, name="Heinz," familyName="Mueller," born=1970, email="hmueller@gross.de," country=49, created="2010-06-12 23:13:19.2"}.

There may also be another map called CountryPrimaryKeyMap in the exemplary database case containing two entries:

1: {id=1, name="USA"} and

49: {id=49, name="Germany"}.

Now, in an embodiment of the present invention, the EAS constructs a map for each index and/or foreign key. For the unique indices, there may be plain maps constructed such as the CountryNameMap with the content:

"USA": {id=1, name="USA"} and

"Germany": {id=49, name="Germany"}, and the UserEmailMap including the content:

"bob_smith@clever.com": {id=1001, name="Bob," familyName="Smith," born=1965, email="bob_smith@clever.com," country=1, created="2010-05-10 11:23:12.3"}, "ytbas@fast.com": {id=1002, name="Maria," familyName="Smith," born=1980, email="ytbas@fast.com," country=1, created="2010-03-12 05:42:22.1"} and "hmueller@gross.de": {id=1234, name="Heinz," familyName="Mueller," born=1970, email="hmueller@gross.de," country=49, created="2010-06-12 23:13:19.2"}.

Now, for the non-unique indices and foreign keys, the EAS, in an embodiment of the present invention, may construct maps containing other maps so that a key may be associated with a plurality of objects. For example, there may be a UserFamilyNameMap that may have keys for each unique familyName including "Smith" and "Mueller." In the exemplary database, there are two entries with the same familyName="Smith" and the EAS then puts the two entries in a map. For the sake of simplicity, we now let User(1001)={id=1001, name="Bob," familyName="Smith," born=1965, email="bob_smith@clever.com," country=1, created="2010-05-10 11:23:12.3"}

User(1002)={id=1002, name="Maria," familyName="Smith," born=1980, email="ytbas@fast.com," country=1, created="2010-03-12 05:42:22.1"}

User(1234)={id=1234, name="Heinz," familyName="Mueller," born=1970, email="hmueller@gross.de," country=49, created="2010-06-12 23:13:19.2"}.

The UserFamilyNameMap may contain:

"Smith": {1001:User(1001), 1002:User(1002)} and

"Mueller": {1234:User(1234)}.

This allows an application to rapidly find all users with the family name "Smith" by querying the UserFamilyNameMap with the Key "Smith" which will return a sub-map with two entries. An application can then, for example, iterate over the users or use the sub-map's keys to locate an object. It should be noted that this search scheme, where the sub-map is obtained, will complete rapidly and in constant-time O(1). The maps UserNameMap, UserBornMap, UserCreated is created in much the same way with sub-maps for each key.

The UserCountryMap is also constructed in the same way. This map is of particular interest since it allows rapid retrieval of all users that belongs to a particular country (via the foreign key). The UserCountryMap will have contain the following entries:

1: {1001:User(1001), 1002:User(1002)}
49: {1234:User(1234)}

This allows the application to quickly and in constant time O(1) find all users with a foreign key to a particular entry in the country table.

Now, there are other cases which also may require quick and constant time map operations. For example, it is possible to define (e.g., via a configuration file) that the EAS also shall produce a composite key consisting of the concatenation of the 'country' and 'born' fields, possibly with a delimiter between the fields. For example, a map called UserCountryAndBornMap can be constructed that contains the following entries:

1_£$_1965:{1001:User(1001)}
1_£$_1980:{1002:User(1002)}
49_£$_1970:{1234:User(1234)}

Note that the UserCountryAndBornMap contains submaps since both the 'country' and 'born' fields are non-unique. If at least one member of the composite key are unique, the resulting map need not contain any sub-maps but can instead contain pure objects. Now that the UserCountryAndBornMap is made, users can be located quickly and in constant-time O(1) using both a country and a born parameters.

So, according to one variant of the current invention, it is possible to combine (using any function that produces an output that depends on all the input keys, such as concatenation, the output preferably having the property that just one combination of the keys shall result in a distinct composite key) any number of column values in a row to form a composite key. The composite key is used as a key in a map to allow quick and constant-time search for arbitrary field match.

As described above, in an embodiment of the present invention, the sub-maps are constructed using the table's primary key. This allows easy update of sub-maps when objects/rows are updated or deleted in the underlying data store.

To optimize storage space, non-unique maps may contain an object if only one object occurs for that key. Should there be new object discovered for that key, the EAS may construct a new sub-map and put both the old existing object an the newly discovered object in the new sub-map. The key is then associated with the new sub-map instead of the old existing object.

Trigger Log

When the data sources have been loaded into memory, the EAS will monitor the underlying data sources for any changes. Once a change (e.g., insert, update or delete) is detected, the corresponding maps are updated to reflect the changes. For example, a distributed Real Time data source Reflector (RTR) may be implemented to allow data to automatically propagate from a backing data source to one or several cache nodes. This ensures compatibility with legacy SQL applications and, because the RTR complies with a novel locking mechanism (as described in more detailed below), it also indirectly contributes to increased query speed.

In one variant of the present invention, the data source (e.g., database) is instructed to react on a trigger (e.g., an SQL trigger).

In the exemplary database it is possible to issue the following commands to the SQL database:

```
DROP TRIGGER IF EXISTS proj1_user_insert ;
delimiter /// CREATE TRIGGER proj1_user_insert AFTER insert ON
'proj1'.'user' FOR EACH ROW BEGIN insert into triggerlog ('cTime',
'type', 'table', primarykey0, 'client') values(now( ), '1', 'user', NEW.id,
user( )); END;/// delimiter ;
DROP TRIGGER IF EXISTS proj1_user_update ;
delimiter /// CREATE TRIGGER proj1_user_update AFTER update ON
'proj1'.'user' FOR EACH ROW BEGIN insert into triggerlog ('cTime',
'type', 'table', primarykey0, 'client') values(now( ), '2', 'user', OLD.id,
user( )); END;/// delimiter ;
DROP TRIGGER IF EXISTS proj1_user_delete ;
delimiter /// CREATE TRIGGER proj1_user_delete AFTER delete ON
'proj1'.'user' FOR EACH ROW BEGIN insert into triggerlog ('cTime',
'type', 'table', primarykey0, 'client') values(now( ), '3', 'user', OLD.id,
user( )); END;/// delimiter ;
```

This may cause any change of the user table to be logged in another table called 'trigger log.' According to an embodiment of the present invention, an EAS can track the trigger log table as it gets filled and update the maps accordingly. This is made by:

1. Determine the type of modification (insert, update or delete)
2. Determine the affected table and primary key (possibly consisting of several columns).
3. Using the table's corresponding PrimaryKeyMap (or any other unique row identification) to obtain the old object.
4. Using the old object (if any, not for insert), remove the object and possibly object keys from all the table's maps.
5. Read the new/updated (if any, not for delete) object from the table.
6. Using the new object (if any, not for delete), insert the object and possibly object keys in all the table's maps.

In an embodiment of the present invention, the order above is changed. In another variant of the present invention, only maps that are affected by a change are updated.

The triggering scheme described above also allows old legacy SQL applications to work in conjunction with the present inventions, greatly simplifying organizations' migration possibilities. Legacy SQL applications can continue to use un-accelerated SQL with no restrictions as before. The system in accordance with the present invention may automatically detect any data manipulation command made to the underlying data source and will update its in-memory store accordingly.

The triggering scheme further allows updates to the underlying data source to be approved by the data source before they are propagated in the in-memory maps. For example, data constrains, foreign keys, transactions, stored procedures and default values may still be enforced by the backing SQL databases' rules. As soon as a value change is approved by a database's rule engine, the change is propagated by the RTR to the various cache nodes and/or application nodes.

Special Maps

It should be noted that a table can have a primary key that is formed by combining an arbitrary number of columns.

SQL databases commonly uses indices to be able to locate rows using expressions.

In an embodiment of the present invention, special maps are used where the key is not stored for each entry. Instead, a static descriptor for the entire map is used to point which fields that comprises the key for each stored object. For example, the UserNameMap may contain a single variable key="name" that is global for the entire map. In this way, the memory space occupied by the map can be reduced. In an embodiment of the present invention, each map (for each key field used) may have a type and offset description (e.g., string and 24).

Read/Write Locks

In many applications, the consistency of the data source and thus the corresponding maps are of great importance. This often leads to the constraint that parts of the maps can only be updated by a single writer. During a write update, no readers and no other writers are allowed. During read, no writers are allowed. These constrains often lead to reduced performance in multi-thread environments.

In one variant of the present invention, a plurality of read locks are used so that thread read contention can be avoided.

In an embodiment of the present invention, write updates are deferred so that they may only be invoked on distinct time-slots. This means that if a read thread has determined that the write lock is not obtained it will remain un-obtained for a guaranteed time and need not be checked. This can improve read performance but will increase write latency. The write thread also need to ensure that it is within the time window after the write lock was obtained or it must release the write lock and continue to wait. The write windows may be dynamically allocated by the system so that when there is a low write/read rate the windows will be separated more in time. For example, if there is one update per minute in average it is perhaps reasonable to say that updates can only occur once every whole second and 1 ms into each whole second. This means that read threads can use 99.9% of the time without even checking the write lock. If a plurality of read locks were used, a write thread can, in a predetermined order, obtain all the read locks and then wait until it is the only holder of the read locks before writing. For example, if a computer can execute 32 threads and 16 read locks are used instead of 1 read lock, the number of thread lock contentions may in many cases be reduced by a factor exceeding 16. In this case, at most 2 threads may access a read lock as opposed to 32 if only one read lock was used. The drawback is that write threads will have to obtain 16 or 17 locks instead of just one or two.

This scheme may lead to starvation for write locks and therefore, according to an embodiment of the present invention, it is possible for a write thread to temporarily disable the time-slot scheme and require normal locking during a short period of time. This will increase the write thread's likelihood of obtain sufficient locks to complete its task. During the disable period, the performance of read threads will be temporarily lowered. In another variant of the present invention, an overall lock scheme scheduler determines the most favorable locking scheme dynamically depending on a maximum likelihood scheme to obtain given thread and performance requirements. For example, if the scheduler determines that write threads have an increasing delay it may increase the time ratio in which normal lock is used and/or increase the length of the write update time-slot. If, on the other hand, write treads are well below its delay metrics it may increase the time ratio that the time-slot lock method is used and/or reduce the write update time-slot.

In an embodiment of the present invention, both time-slotted write locking and multiple read locks can be used. In other embodiments, the time-slotted write locking method and the use of multiple read locks can be separately implemented.

Figure 7:
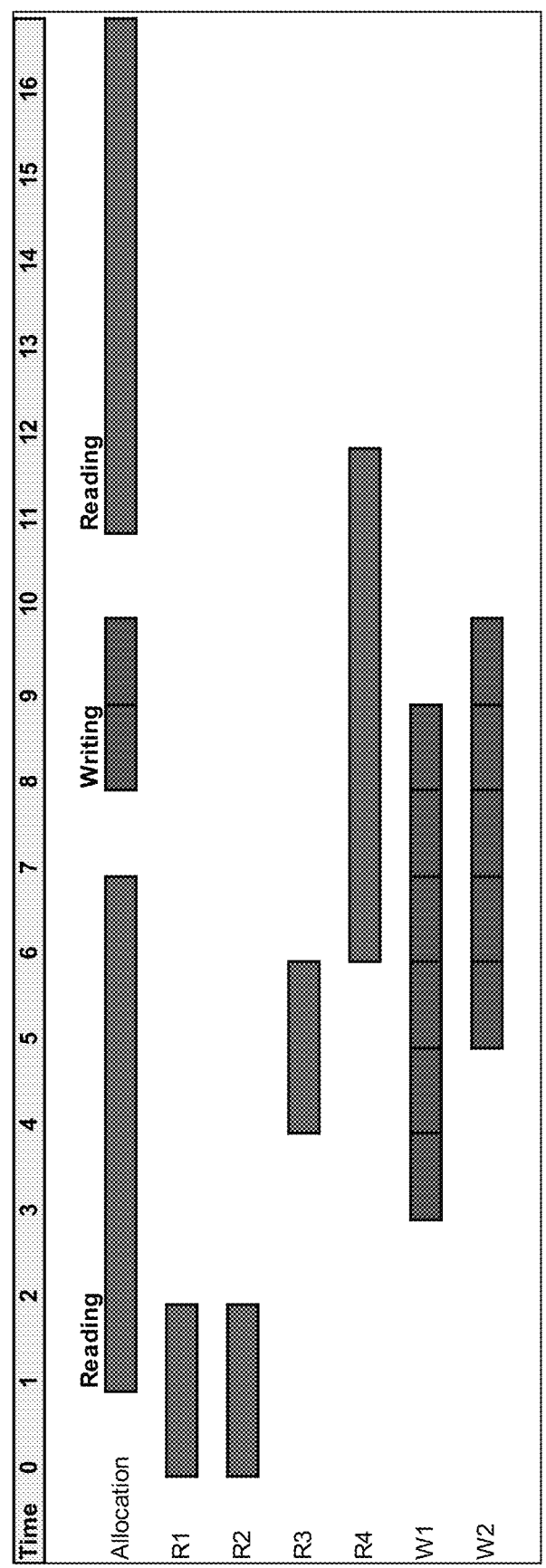
FIG. 7 illustrates a communication system with an improved solution where a number of different communication networks and nodes are interconnected in accordance with one or several embodiments of the present invention depicting a locking algorithm.

FIG. 7 illustrates a communication system with an improved solution where a number of different communication networks and nodes are interconnected in accordance with one or several embodiments of the present invention depicting a locking algorithm.

In FIG. 7, there is a first set of time intervals where read operations may take place (indicated by Allocation:Reading) and a second set of time intervals disjoint from the first set where write operations may take place (indicated by Allocation:Writing). Read threads R1 and R2 are both waiting for the Allocation:Reading and at Time 1, they both concurrently accesses the lock protected data objects and computes some sort of a results, for example a complete copy of the data objects. Upon completing at Time 2, both threads concludes that they have performed the read within the stipulated time limit (which is Time 7 in this case). At Time 4, read thread R3 enters and immediately determines that is within a valid Allocation:Reading time slot. After accessing the protected data objects, it too completes within the stipulated time slot. R4 however, enters at Time 6, which is within the read time slot, accesses the protected data objects, but can not complete within the time slot. Therefore it must wait until the next Allocation:Reading starts (which it does at Time 11) and re-issue the access to the protected data objects (since they might have changed during a Allocation:Writing time slot). Thread TW1 enters during the Allocation:Reading period and must therefore wait until an Allocation:Writing time slot appears. If there is only one write thread, then this single one may assume that it can write to the protected data objects any time during the Allocation:Writing time slot. However, if several write threads exists in an application, for example, both W1 and the W2 thread, can potentially write to the protected data objects, then neither of them can write to the protected data objects directly. One way to solve the problem is to introduce an additional layer of locking on just the write threads, For example, normal locking according to state of the art technology may be employed among the write threads, to prevent several write threads to modify the protected data objects. Alternately, separate write time slots can be allocated for each write thread. For example, there might be one Allocation:Writing(1) for write thread 1 and another Allocation:Writing(2) for write thread 2 whereby the Allocation:Writing(1) and the Allocation:Writing(2) cannot exist simultaneously (and not simultaneous as any Allocation:Reading).

Write Acceleration for Bottleneck Tables

In environments where the write capacity of an ordinary SQL server is too low, accelerated writes may be provided to an internal data source. In this mode, objects are not stored in a backing database but within the cluster of nodes itself. Because objects are persisted directly on local discs, the backing database cannot validate the objects' constrains. Instead, constrains are validated by a cluster rule engine. This gives a substantial speed increase but provides a less stringent consistency environment. Redundancy can be provided over several nodes within a cluster. Individual tables can be selected for write acceleration. For example, a log table with many updates and inserts would be a suitable candidate for write acceleration.

Database Transactions

Data sources often support transactions. A database transaction comprises a unit of work performed within a database management system (or similar system) against a database, and treated in a coherent and reliable way independent of other transactions. Transactions have two main purposes: to provide reliable units of work that allow correct recovery from failures and keep a database consistent even in cases of system failure, when execution stops (completely or partially) and many operations upon a database remain uncompleted, with unclear status; and to provide isolation between programs accessing a database concurrently.

Transaction isolation is maintained so that the system always will reflect a valid state of the backing SQL database at any given time instance. Without isolation, the programs' outcomes are possibly erroneous. A transaction either succeeds or fails in its entirety. A database transaction, by definition, must be atomic, consistent, isolated and durable (commonly referred to as "ACID"). Several read and write lock modes are available, allowing applications to optimize balance between speed and consistency requirements at any given time.

It is important that any caching scheme complies with the transaction paradigm. In an embodiment of the present invention, when the triggering method is used to track changes in underlying data sources, the maps are updated atomically (e.g., using write/and read locks) such that transaction are processed in a batch. In an embodiment of the present invention, it is possible to inspect entries in the trigger log (e.g., cTime) and determine when the entries were inserted in the trigger log. It is necessary for all operations in a single transaction to have the same cTime in the trigger log. On the other hand, there may be operations in the trigger log with the same cTime that does not belong to the same transaction. This is an important distinction. In an embodiment of the present invention, all operations that occurred on the same data source time are considered to be the same transaction. This ensures that all operations within a transaction is updated correctly but there is the possibility that several transactions are unnecessarily performed atomically. The greater the time resolution at the data source, the less likelihood of unnecessarily atomic updates.

In another variant of the present invention, a transaction number generated by the data source is used to determine which operations belongs to the same transaction.

It shall be noted that there are a number of synchronization methods other than locks including monitors and get/set instructions etc. and that the present invention is not limited to just locks as a synchronization means. Instead it may use a set of other synchronization methods available to any one skilled in the art.

In an embodiment of the present invention, special computational resources can be used to compress objects. For example, a GPU of a computer may be used to compress objects in parallel.

Figure 8:
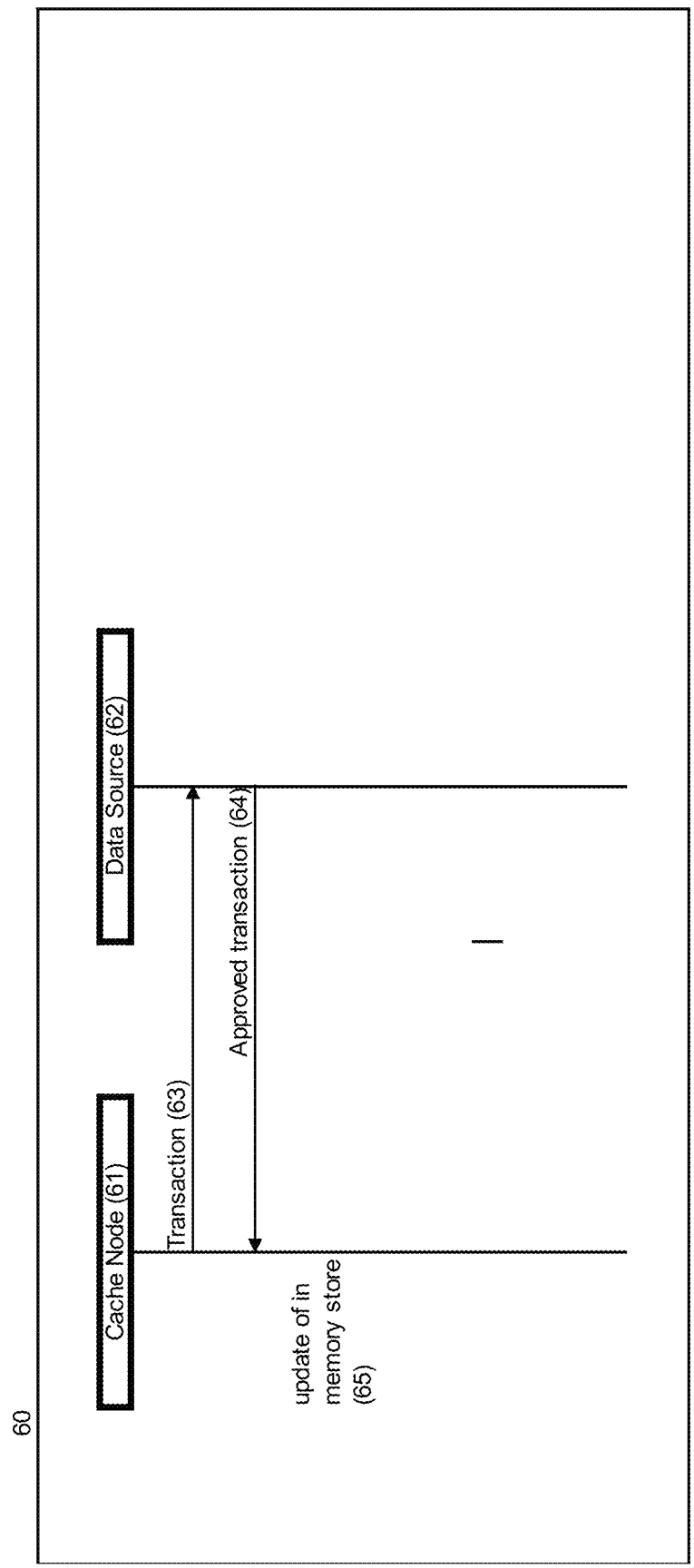
FIG. 8 illustrates a communication system with an improved solution where a number of different communication networks and nodes are interconnected in accordance with one or several embodiments of the present invention depicting the path of a transaction initiated by a cache node.

FIG. 8 illustrates a communication system with an improved solution where a number of different communication networks and nodes are interconnected in accordance with one or several embodiments of the present invention depicting the path of a transaction initiated by a cache node.

FIG. 8 shows an improved communication system (60), according to some embodiments of the present invention, where a cache node (61) is connected to a data source (62).

The cache node initiates a transaction (63) (such as an SQL update statement or a compound SQL update statement). The transaction is received by the data source (62) that evaluates the transaction against its rules. If the transaction was approved, the cache node is notified (64) and subsequently updates its in-memory store (65).

Figure 9:
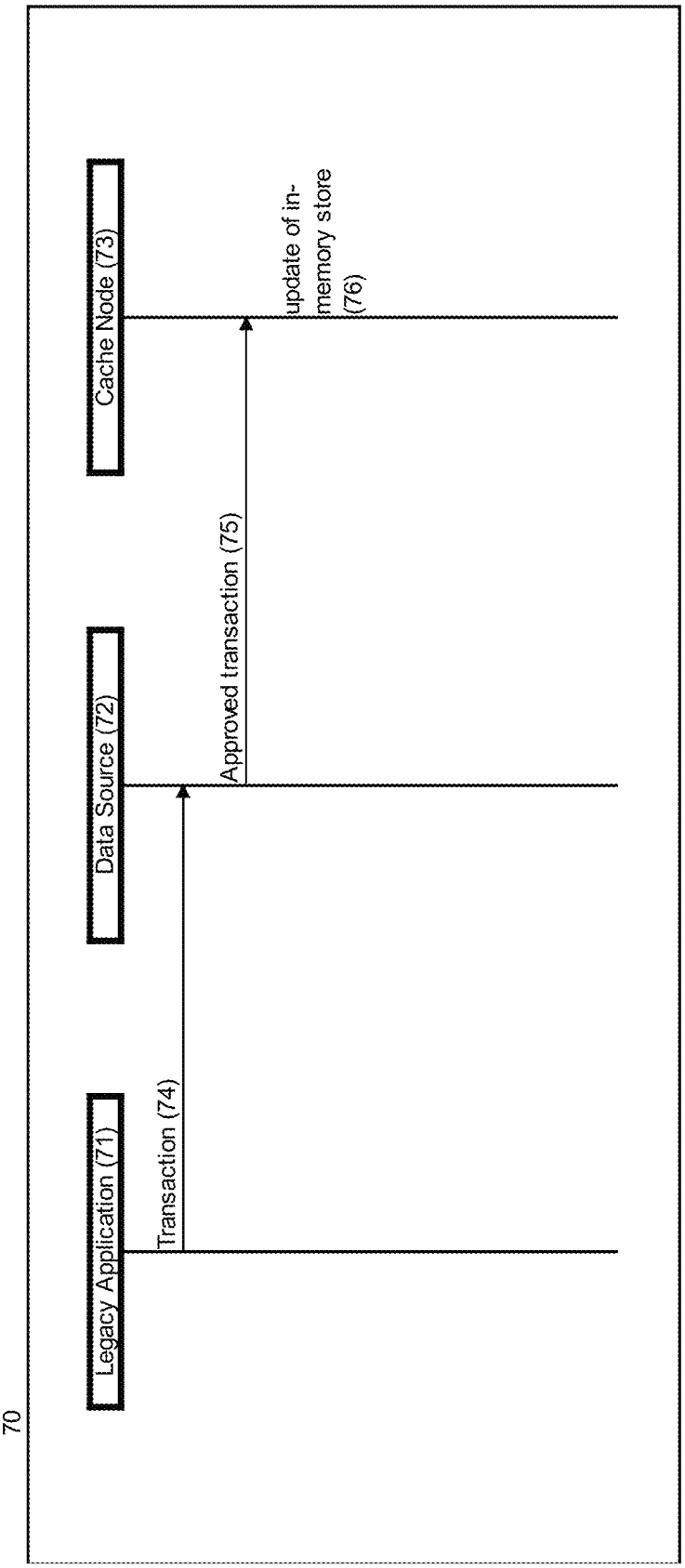
FIG. 9 illustrates a communication system with an improved solution where a number of different communication networks and nodes are interconnected in accordance with one or several embodiments of the present invention depicting the path of a transaction initiated by a legacy application.

FIG. 9 illustrates a communication system with an improved solution where a number of different communication networks and nodes are interconnected in accordance with one or several embodiments of the present invention depicting the path of a transaction initiated by a legacy application.

FIG. 9 shows an improved communication system (70), according to some embodiments of the present invention, where a legacy application (71) is connected to a data source (72). A cache node (73) is connected to the data source (72). The legacy application (71) independently initiates a transaction (74) (such as an SQL update statement or a compound SQL update statement). The transaction is received by the data source (72) that evaluates the transaction against its rules. If the transaction was approved, the cache node is notified (75) and subsequently updates its in-memory store (76).

EAS Nodes

In an embodiment of the present invention, EAS nodes that are started may discovered other EAS nodes in its proximity. This can be done, for example, by probing hosts on the same sub-net and on a predefined port. The EAS can then compare its version and its configuration and, if appropriate, may join the EAS nodes in a cluster. The EAS then need not to load its maps from the underlying data store but can instead obtain the content of the maps from other EAS's in the cluster. The EAS may, before it downloads the map content, record a description of the update state of the other EAS nodes. Once it has downloaded the content from the EAS's it may update its state from the start point to the present state by either updating from the cluster members or the underlying data source. This scheme often allows a significantly faster load phase than using the underlying data source.

In an embodiment of the present invention, different nodes in a cluster may handle separate sets of tables to increase the overall storage capacity.

Automated Code Generation

Writing code is often a tedious and error prone procedure. In an embodiment of the present invention, programmers can present a representation of one or more data sources (including its structure and possibly its content). The system then analyses the structure and content of the data source and creates code that reflects the data store, greatly simplifying programming. In an embodiment of the present inventions, programmers can define the own rules to the code writer, allowing them to control, extend or change the way code is generated. For example, it is possible to extend code that is generated by a base variant of the system. These rules (called plugins) can also be made available to other programmers (e.g., using an on-line market place).

According to one embodiment of the present invention, selected databases, schemas, tables and other properties may be automatically analyzed to produce source code which is open, documented and changeable. Programmers may be presented with an object oriented view of the databases' tables. This means that developers can focus on business logic and be freed up from managing database optimization and from writing and maintaining boilerplate code. It also prevents programming errors. It may be desirable to employ a pluggable architecture which allows extensions to any database object or result map. The pluggable architecture makes is easy to extend the database acceleration functionality.

FIG. 10 illustrates an exemplary relational database structure.

Figure 11:
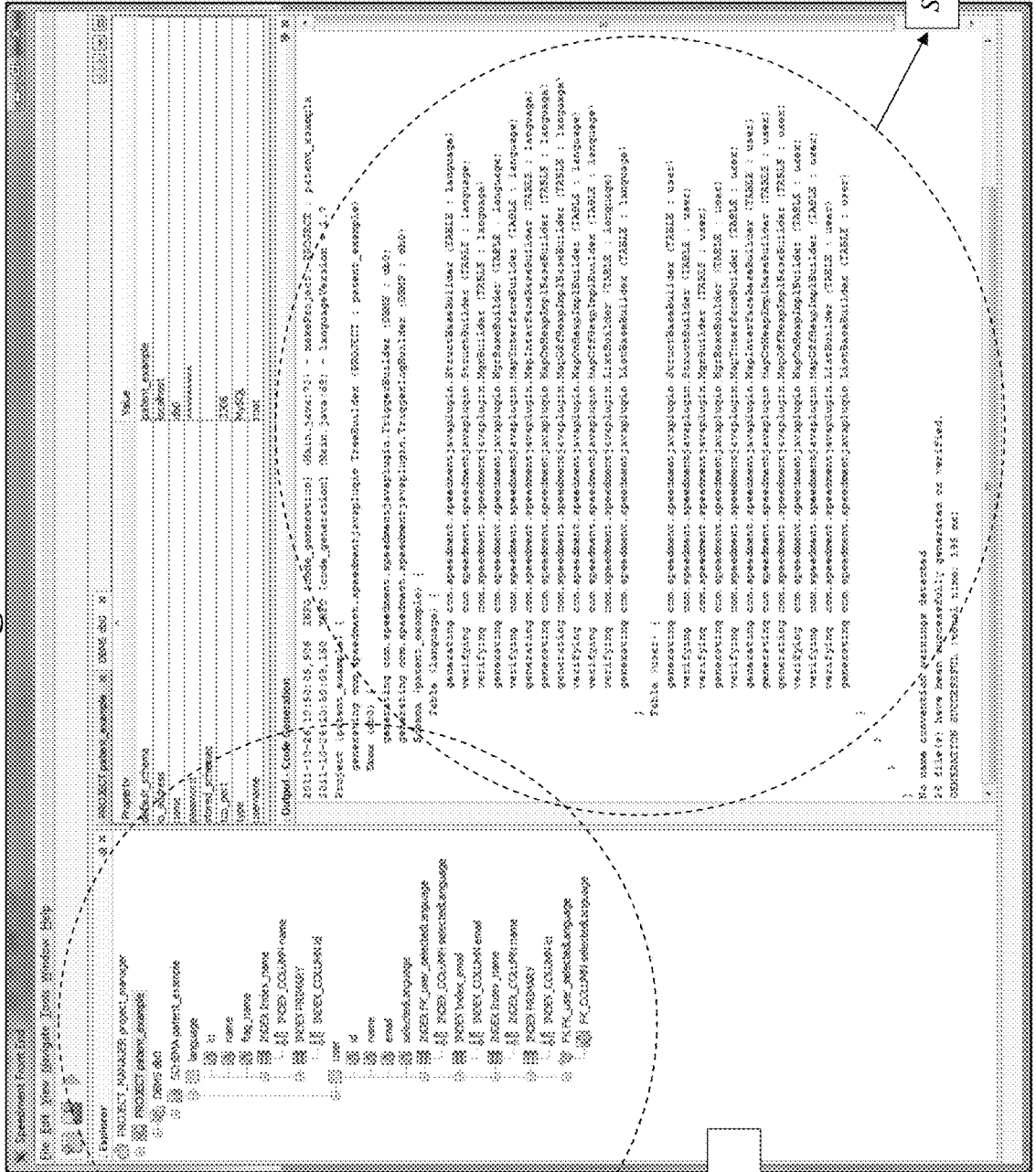
FIG. 11 illustrates a part of a communication system with an improved solution in accordance with one or several embodiments of the present invention relevant to the example in FIG. 10 depicting relational database analysis and code generation.
Figure 11B:
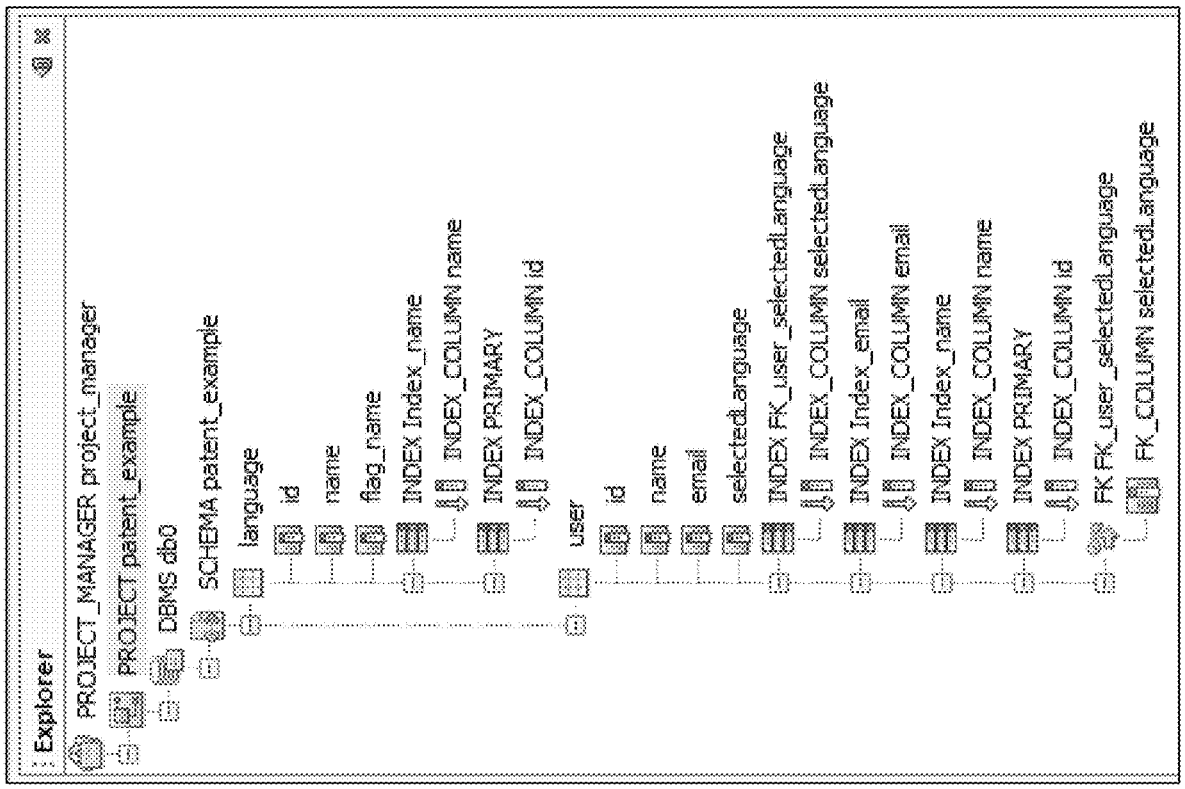

FIG. 11 illustrates a part of a communication system with an improved solution in accordance with one or several embodiments of the present invention relevant to the example in FIG. 10 depicting relational database analysis and code generation.

In FIG. 11, one embodiment of the present invention is used to connect to a relational database (as described in FIG. 10) whereby the structure of the database is analyzed and corresponding Java files are generated as a result of the analysis. The Java files are saved on a file system.

Figure 12:
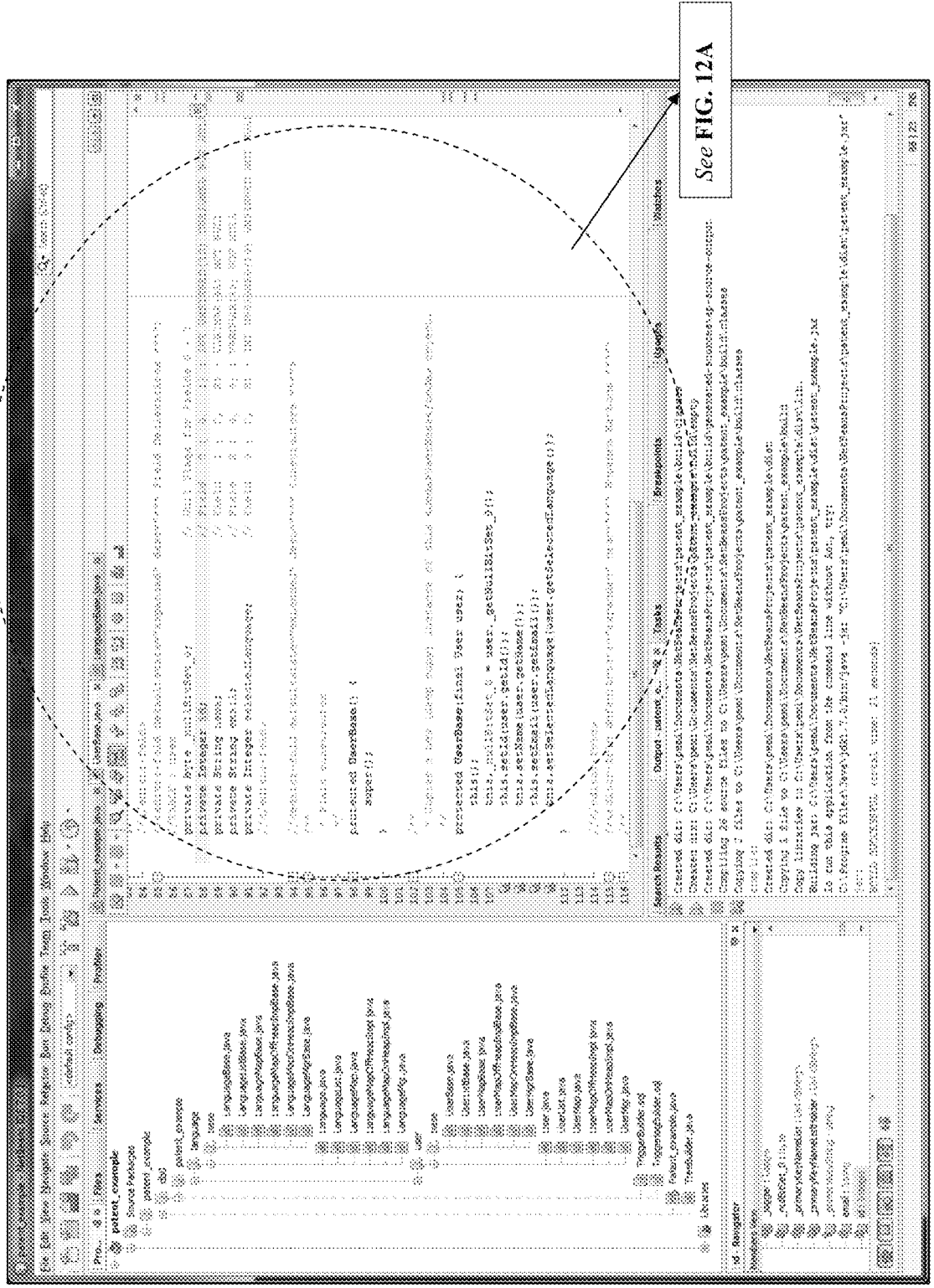
FIG. 12 illustrates a part of a communication system with an improved solution in accordance with one or several embodiments of the present invention relevant to the example in FIG. 10 and FIG. 11 depicting an example of generated code.
Figure 12B:
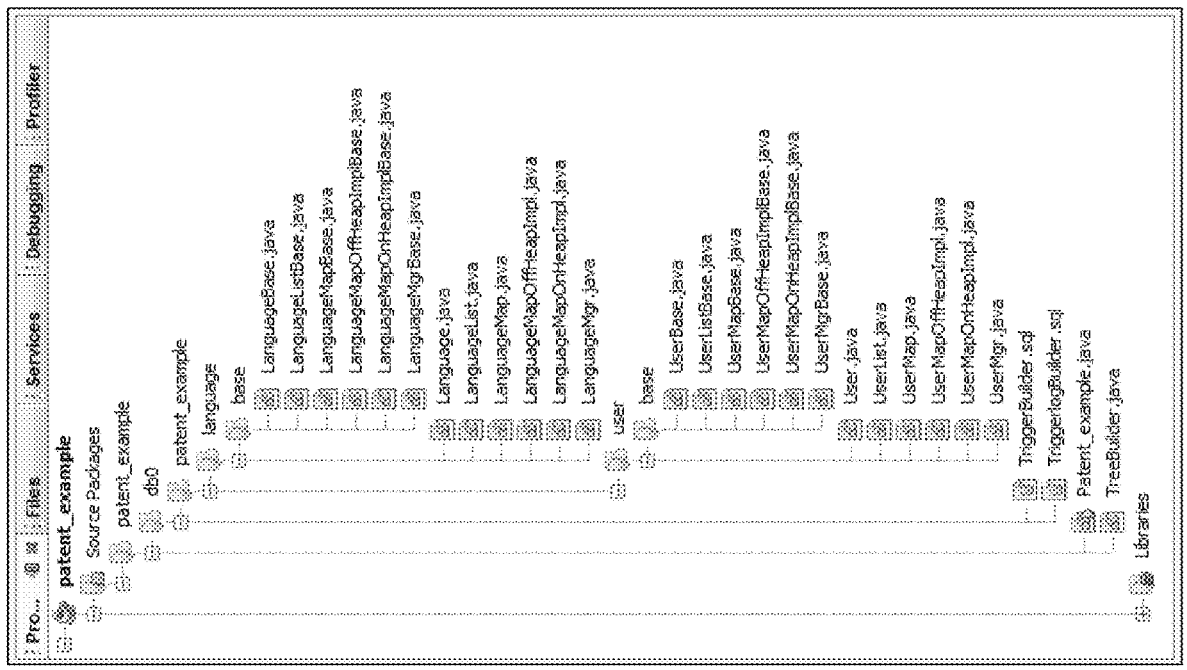

FIG. 12 illustrates a part of a communication system with an improved solution in accordance with one or several embodiments of the present invention relevant to the example in FIG. 10 and FIG. 11 depicting generated code.

In FIG. 12, the Java files are imported in an Integrated Development Tool (IDE). The structure of the Java files are shown as well as parts of the object User (and the underlying UserBase) that corresponds to the exemplary table 'user' depicted in Picture 8.

In FIGS. 13A-13C, a code snippet of a Manager (that corresponds to the User table) is shown wherein the use of Maps is illustrated together with the method of adding initial/new/updated rows from the user table. The UserMgr just extends the UserMgrBase analogue to how User extends UserBase. Manager code is generated such that, amongst other things, the indices and foreign keys are used to create associative maps. For example, the "Index_name" index, which is a non-unique index on user name, will implicate that a "nameMap" is generated. The nameMap maps a user name (e.g., "John") to another map (in this case a UserMapOnHeapImplementation) that contains all the Users that have a certain key as explained here-over. Another example is the index "Index_email", which is a unique index on user e-mail. Because it is unique, the previous map-in-map scheme is not needed. Instead, a map "emailMap" is generated. The emailMap directly maps an email to a User object. A third example is the Index (FK_user_selected_language) that has been created because there is a foreign key between the user.selected_language and the language.id column. The map for this index works the same way as the nameMap.

Further down, a method for adding new Users is depicted. When the method is called, the primary key (which is unique) is determined. After a write-lock has been obtained (preventing any read or write threads to make simultaneous access during a potential atomic update over several Managers), the added User object is inserted in the maps. Corresponding "finder" methods that can retrieve User objects or UserMaps directly from a key can also be generated as shown in the findAll( ), findId( ), findByName( ) and findById( ). They all complete in constant time and each exposes a "predicted answer".

OpenPlugin APIs may be provided which also support an SQL like method chain invocation scheme with full acceleration capabilities. For example, instead of issuing a standard sql command like:

"select * from user where name='John' order by surename limit 100" the following may be written instead:

```
UserMap userMap =
UserMgr.findByName("John").orderBy("surename").limit(100);
```

Using the OpenPlugin API(s), it is possible for developers to write their own code generation plugins and code extension plugins. This enables expansion and adoption of the existing API with ease and a relatively easy implementation of support for new programming languages. The API(s) may also support event handling and messaging. Applications can subscribe directly to data changes by registering standard Java Bean event listeners. This allows a stream based programming paradigm as well as dynamic GUI implementations. The need for constant database polling may be completely eliminated.

In summary, because we assume that the complete database is in the same node, we can pre-compile responses to likely queries before hand. So, we cache not only the elements themselves but also the queries that will eventually retrieve them. This approach is like moving up one step in terms of cache level. Also, the locking mechanisms becomes much more effective under the precondition above. Distributed locking is avoided completely. The locking mechanism itself is also improved. Furthermore, because the objects and indexes are on the same node, communication can be reduced compared to the case where things are scattered.

Because latency is reduced, a single thread can perform a higher number of queries per time unit. Thus, capacity is inherently increased since a single thread's capacity is inversely proportional to its latency. More importantly, embodiments of the invention allow concurrent lock free thread access under common circumstances. This means that capacity can be further linearly scaled with the number of concurrent threads that can be run by the server (i.e. it scales linearly with the number of CPU cores). Additionally, the clustering of nodes further increases capacity in a linear and non-blocking fashion.

Because the backing databases no longer need to respond to a large number of queries, capacity is freed. Some database implementations are hampered whenever there are a high number of mixed outstanding reads and writes to the database, because locking and consistency becomes a major issue. Since the number of application reads is potentially reduced, or even eliminated, with the use of the present invention, database benefits are further enhanced.

EXAMPLES

Example A

Following is an illustrated programming model where, in accordance with an embodiment of the present invention, a node is used to accelerate a database with:
 a table named 'user' that holds all the users of a web site, and
 another table called 'language' that holds a number of languages that the users can have.
The 'user' table has the following fields:

id (Primary Key)
name
email
selectedLanguage

The 'language' table has the following fields

```
id (Primary Key)
name
flag_name
```

The 'user' table is sorted on its 'email' column uniquely. There is a foreign key constraint so that the selectedLanguage field must point to a valid 'id' of the language table.

In this example, the user's email is known (in the string email variable) and the task is to obtain the flag_name in order to welcome the user whenever she has logged in.

```
String flagName = null;
User user = UserMgr.getInstance( ).findByEmail(email);
    if (user!=null) {
    Language language = user.getLanguageObject( );
    flagName = language.getFlagName( );
    out.println(flagName);
} else {
// No user with this email was found ...
}
```

Example B

In the next example the task is to print all users who speak Spanish and whose name is "Jose."

```
Language spanish =LanguageMgr.getInstance( ).findByName("Spanish");
for (User user:UserMgr.getInstance( ).FindByLanguage(spanish).
where("name='Jose'")){out.println(user.toString( ));
}
```

Example C

This third example illustrates event handling capabilities of an embodiment of the present invention when the task is to alert an operator whenever a new user register with a .com email address.

```
// The actual event handler
public class DotComEventHandler implements PropertyChangeListener {
@Override
public void propertyChange(PropertyChangeEvent evt) {
    User user = (User)evt.getNewValue( );
        if (user!=null && user.getEmail( ).endsWith(".com")) {
            out.println("Hi "+user.getName( ));
        }
    }
}
//Register the subscription with the UserMgr
UserMgr.getInstance( ).addPropertyChangeListener
(new DotComUserEventHandler( ));
```

The foregoing examples are simplified and do not take transaction isolation into account. In these examples, the classes User, UserMgr, Language and LanguageMgr were written automatically by the automatic code generation module described above.

Technical Specifications of One Embodiment

The following is a list of technical specifications of one embodiment of the present invention, referred to as a Speedment Ace system:

| Environment | |
|---|---|
| Operating systems supported: | Linux, Solaris, Solaris x64, Windows 7/XP/Vista/2000/2003/2008, OS X |
| Supported databases: | Oracle, MySQL or Microsoft SQL-Server |
| Supported languages: | Java (native), .NET/C#, C++, Flex/Flash or XML over http |
| Ace nodes per cluster: | Max 16 |
| Spawn schemas: | Yes |
| Spawn databases: | Yes |
| Performance (*) | |
| Typical RTR latency: | 100 ms |
| Typical PK query latency: | 250 ns |
| Typical PK query capacity: | 100 million queries/s per node |
| Maximum nodes per cluster: | 16 |
| Total PK query capacity per cluster: | >1.6 billion queries/s per cluster. |
| Maximum clusters: | Unlimited |
| PK search: | O(1) |
| PK sort: | O(1) |
| Index equality search: | O(1) |
| Multiple index search: | O(1) |
| Multiple index sort: | O(1) |
| FK object find: | O(1) |
| FK object list find: | O(1) |

(*) Performance was measured on a Linux CentOS 64-bit, with no hardware acceleration, one single HP Proliant ML 150 G5, 2 CPUs (E5405@2 GHz) 16 GB server, Java SE 1.7 64-bit server mode, Java client application with 16 threads. Backing data source MySQL 5.0.77.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A computer-implemented method for applications to obtain digital objects from a data source, comprising:
identifying a set of digital objects that are associated with a data source, that have a first representation within the data source, and that shall be subject to accelerated access, the first representation comprising a database data structure comprising a table;
constructing additional data structures, stored in memory cache, to retrieve digital objects rapidly thereby transforming, in a first application disjunct from the data source, the first representation of the identified set of digital objects into a second corresponding representation thereof, the additional data structure being constructed for fast retrieval of data objects using an index key defined in the first representation, whereby: (i) the second corresponding representation is different from the first representation, (ii) comprises a tableless data structure and, instead, comprising one or more objects defined using one or more primitives of a programming language, and (iii) allows selection of a subset of the identified digital objects;
locating and returning of the subset is performed in constant time regardless of the size of the subset and regardless of the size of the data source by speculatively querying the second corresponding representation of the set of digital objects using associative mapping;

detecting, in the data source, any changes to the identified set of digital objects and making the changes available for monitoring or notifying the first application of the changes;

monitoring, in the first application disjunct from the data source, the changes to the data source relevant to the identified set of digital objects;

updating, in the first application, upon detecting a change in the data store, the second corresponding representation using update, delete or add methods;

receiving, from a user application, a request for one or more digital objects whereby a set of request parameters are specified;

locating, in the first application disjunct from the data source and/or in the user application, a subset of the second corresponding representation of the identified set of digital objects in view of the set of request parameters using the associative map with one or more requested parameters as a key; and returning, to the requesting user application, the subset, wherein the data source is not involved in the receiving, locating or returning steps.

2. The method of claim 1, the data source is a relational database management system.

3. The method of claim 2, further comprising:
detecting changes to the identified set of digital objects in the data source using SQL triggers in the data source.

4. The method of claim 3, further comprising:
updating the second corresponding representation of the identified set of digital objects as a single transaction to reflect a corresponding transaction update in the data source.

5. The method of claim 1, further comprising:
generating code by a second application that reflects the identification of existing or future digital objects in the data source.

6. The method of claim 1, further comprising:
compressing a subset of the second corresponding representation of the identified set of digital objects.

7. The method of claim 1, further comprising:
serializing a subset of the second corresponding representation of the identified set of digital objects to an internal memory or to a secondary storage.

8. The method of claim 1, further comprising:
in view of a provided materialized SQL query, maintaining a corresponding result set immediately available upon request.

9. The method of claim 1, wherein the first application and the user application runs on a same computer node.

10. The method of claim 1, wherein to select the subset of the identified digital objects, the method comprises speculatively querying the second corresponding representation of the set of digital objects.

11. The method of claim 1, wherein the selection of the subset of the identified digital objects is performed using associative mapping.

12. The method of claim 1, wherein locating the subset of the second corresponding representation of the identified set of digital objects comprises determining that a write lock is inactive.

* * * * *